United States Patent
Regan et al.

(10) Patent No.: US 7,466,336 B2
(45) Date of Patent: Dec. 16, 2008

(54) CAMERA AND METHOD FOR COMPOSING MULTI-PERSPECTIVE IMAGES

(75) Inventors: Michael T. Regan, Fairport, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 628 days.

(21) Appl. No.: 10/235,524

(22) Filed: Sep. 5, 2002

(65) Prior Publication Data

US 2004/0046885 A1   Mar. 11, 2004

(51) Int. Cl.
*H04N 13/00* (2006.01)
*H04N 15/00* (2006.01)
*H04N 13/02* (2006.01)
*H04N 5/225* (2006.01)
*H04N 5/222* (2006.01)

(52) U.S. Cl. ............................. 348/50; 348/42; 348/49; 348/218.1; 348/333.03

(58) Field of Classification Search ................... 348/42, 348/46, 50, 52, 59, 218.1, 47, 48, 333.01–333.13; 396/324–326
See application file for complete search history.

(56) References Cited

U.S. PATENT DOCUMENTS

| | | | |
|---|---|---|---|
| 4,613,899 A | 9/1986 | Kuwano et al. | |
| 4,754,327 A | 6/1988 | Lippert | |
| 4,807,024 A | 2/1989 | McLaurin et al. | |
| 4,881,122 A * | 11/1989 | Murakami | 348/47 |
| 4,967,276 A | 10/1990 | Murakami et al. | |
| 5,325,193 A | 6/1994 | Pritchard et al. | |
| 5,448,294 A * | 9/1995 | Yamazaki | 348/230.1 |
| 5,471,237 A | 11/1995 | Shipp | |
| 5,570,150 A | 10/1996 | Yoneyama et al. | |
| 5,640,222 A | 6/1997 | Paul | |
| 5,699,108 A * | 12/1997 | Katayama et al. | 348/47 |
| 5,715,383 A * | 2/1998 | Schindler et al. | 345/419 |

(Continued)

FOREIGN PATENT DOCUMENTS

| | | | |
|---|---|---|---|
| JP | 64-86129 | * | 3/1989 |
| JP | 64-086129 | * | 3/1989 |

*Primary Examiner*—David L Ometz
*Assistant Examiner*—Richard M Bemben
(74) *Attorney, Agent, or Firm*—Roland R. Schindler, II; Peyton C. Watkins

(57) ABSTRACT

A camera that is adapted to present a preview image is provided. The camera has a trigger adapted to generate a trigger pulse and an image capture system for capturing images of a scene. A viewer is adapted to present one image to a first viewing area and another image to a second viewing area. A controller is adapted to receive a first trigger pulse and to cause the image capture system to capture a first image of the scene in response to the first trigger pulse. The controller is also adapted to receive a second trigger pulse and to cause the image capture system to capture a second image of the scene in response to the second trigger pulse and to cause the viewer to simultaneously present the first image to the first viewing area and to present the second image to the second viewing area. An observer positioned with a first eye in the first viewing area and a second eye in the second viewing area can detect parallax differences between the first image and the second image.

26 Claims, 13 Drawing Sheets

U.S. PATENT DOCUMENTS

| | | | |
|---|---|---|---|
| 5,724,071 A | 3/1998 | Morton et al. | |
| 5,835,133 A | 11/1998 | Moreton et al. | |
| 5,883,695 A | 3/1999 | Paul | |
| 5,903,303 A * | 5/1999 | Fukushima et al. | 348/47 |
| 6,088,053 A * | 7/2000 | Hammack et al. | 348/61 |
| 6,094,215 A * | 7/2000 | Sundahl et al. | 348/42 |
| 6,108,130 A | 8/2000 | Raj | |
| 6,112,033 A * | 8/2000 | Yano et al. | 396/323 |
| 6,151,164 A | 11/2000 | Greening et al. | |
| 6,271,876 B1 * | 8/2001 | McIntyre et al. | 348/46 |
| 6,301,447 B1 | 10/2001 | Jackson et al. | |
| 6,421,504 B1 * | 7/2002 | Saito et al. | 396/67 |
| 6,507,358 B1 * | 1/2003 | Mori et al. | 348/42 |
| 6,510,283 B1 * | 1/2003 | Yamagishi | 396/55 |
| 6,704,465 B2 * | 3/2004 | Aoi et al. | 382/305 |
| 6,724,325 B2 * | 4/2004 | Fox | 341/51 |
| 6,809,771 B1 * | 10/2004 | Hamaguchi et al. | 348/335 |
| 6,864,911 B1 * | 3/2005 | Zhang et al. | 348/42 |
| 6,888,563 B2 * | 5/2005 | Suzuki et al. | 348/42 |
| 6,894,719 B2 * | 5/2005 | Blish et al. | 348/207.99 |
| 6,909,802 B2 * | 6/2005 | Nakamura | 382/154 |
| 6,930,704 B1 * | 8/2005 | Hamada | 348/42 |
| 7,190,389 B1 * | 3/2007 | Abe et al. | 348/42 |
| 2001/0014221 A1 * | 8/2001 | Tomita | 396/325 |
| 2002/0009137 A1 | 1/2002 | Nelson et al. | |
| 2002/0021354 A1 | 2/2002 | Suzuki et al. | |
| 2002/0036701 A1 * | 3/2002 | Yamashita | 348/333.05 |
| 2003/0020807 A1 * | 1/2003 | Khoshnevis et al. | 348/42 |

* cited by examiner

CAMERA AND METHOD FOR COMPOSING MULTI-PERSPECTIVE IMAGES

FIELD OF THE INVENTION

The present invention relates to a camera and methods for generating multi-perspective images.

BACKGROUND OF THE INVENTION

Photographic and imaging systems are primarily designed for use in creating two-dimensional images. In a two-dimensional image, only one perspective is needed. Human vision, however, views scenes from two perspectives with one perspective provided by each eye of an observer. The parallax that exists between the perspectives is interpreted by the mind of the observer to provide depth information about the scene being viewed. Various electronic and photochemical imaging techniques have been developed that capture images of a scene taken from different perspectives. These images are later processed and displayed to a user so that one eye of an observer is exposed to an image of the scene from one perspective while the other eye of the observer is exposed to another image taken from another perspective. This creates the parallax difference necessary to create the appearance of depth in the mind of the observer.

Only two images are necessary to create this appearance of depth. Stereo imaging systems are known that present pairs of images of a scene that are taken at different perspectives to different eyes of an observer. Such stereo systems create a useful depth view of a scene as it appears at one viewpoint relative to the scene. However, to provide a depth image of a scene having an improved appearance, more than two images can be incorporated into a single display. This permits a user to simulate the experience of looking around an object to view subject matter in depth from more than one viewpoint. An example of a display system that provides such a look around effect is found in commonly assigned U.S. Pat. No. 5,715,383 entitled "Compound Depth Image Display System" filed by Schindler et al. on Sep. 28, 1992.

In all multi-perspective imaging systems, the apparent depth in the scene is proportional to the extent of the parallax-induced differences between the presented images. The extent of such parallax-induced differences is determined in part by the degree of separation between the captured images and in part by the distance from the captured images to the scene. Typically, depth imaging systems combine images that are captured at generally the same distance from the scene. This simulates the way that the eyes of a human observer will see a scene. Accordingly, the apparent extent of depth in the resultant output is typically modified by varying the degree of separation between the captured images. This creates an important issue for a photographer in preparing a multi-perspective image: the challenge of selecting the proper combination of images necessary to provide a desired depth effect.

In some cameras and photography methods this challenge is met by the use of cameras that have a fixed separation between the images and thus, the perspective is pre-selected. For example, it is known to capture stereo and depth images using cameras having multiple image capture systems to record multiple images of a scene. See for example, commonly assigned U.S. Pat. No. 6,271,876 entitled "Using Two Different Capture Media to Make Stereo Images of A Scene" filed by McIntyre et al. on May 6, 1997. See also U.S. Pat. No. 4,967,276 entitled "Apparatus for Formatting and Viewing a Stereoscopic Video Frame" filed by Gallaher. Alternatively, it is known to use a camera that provides a single optical path and that is moved along a fixed track. See also U.S. Pat. No. 5,883,695 entitled "Method and Apparatus for Producing Stereoscopic Images with Single Sensor" filed by of Paul on Sep. 19, 1997. See also U.S. Pat. No. 5,325,193 entitled "Single Camera Autostereoscopic Imaging System" filed by Pritchard on Oct. 20, 1992. In such systems, different perspectives are captured as the camera is moved to fixed locations along the path.

What is needed is a system that permits a photographer greater control in selecting the extent of separation between images and therefore the extent of the apparent depth in an image. This control can be provided by allowing the photographer to selectively position the camera to take individual images of the same scene from selected perspectives. These images are later reassembled to form a multi-perspective image. The images can be combined using polarizing techniques and viewed through polarizing glasses. An example of a photography system and method of this type is found in U.S. Pat. App. Pub. No. 2002/0021354 entitled "Image Sensing Apparatus". One difficulty in using systems and methods of this type is that it is often difficult for the photographer to know at the time of capture what effect the combination of images will achieve when they are eventually rendered. Where the photographer is not satisfied, the photographer must reestablish the scene and use an iterative process to create the desired image. This iterative process can become time consuming and burdensome particularly where the multi-perspective image incorporates images that are captured at three or more different perspectives.

However, in giving the photographer greater control, it is important to provide the photographer with the ability to predict how the resultant multi-perspective image will appear when rendered. Cameras that provide a verification system of individual images captured by a camera do not solve this problem because they are typically adapted to show only one captured image at a time. Even where such cameras are adapted to show more than one image at a time, they do not separate the perspective images in a manner that creates the parallax necessary for the image to appear in depth.

Thus, what is needed is a photography method and a photography system that permits a photographer to see a preview or verification representation of a multi-perspective image during composition and afterward.

SUMMARY OF THE INVENTION

In one aspect, a camera adapted to present a preview image is provided. The camera has a trigger adapted to generate a trigger pulse and an image capture system for capturing images of a scene. A viewer is adapted to present one image to a first viewing area and another image to a second viewing area. A controller is adapted to receive a first trigger pulse and to cause the image capture system to capture a first image of the scene in response to the first trigger pulse. The controller is also adapted to receive a second trigger pulse and to cause the image capture system to capture a second image of the scene in response to the second trigger pulse and to cause the viewer to simultaneously present the first image to the first viewing area and to present the second image to the second viewing area whereby an observer positioned with a first eye in the first viewing area and a second eye in the second viewing area can detect parallax differences between the first image and the second image.

In another aspect, a camera adapted to present a preview image is provided. The camera has a trigger adapted to generate a trigger pulse and an image capture system for capturing images. A viewer is adapted to present a first captured image to a first viewing area and to present other captured images to a second viewing area. A controller is adapted to receive a first trigger pulse and to cause the image capture system to capture a first image in response thereto. The controller is further adapted to cause the image capture system to capture a stream of images and the viewer to present the stream of images to the second viewing area while simultaneously presenting the first image to the first viewing area, with the controller also being adapted to receive a second trigger pulse and, in response thereto, to select one of the stream of images as a second image. An observer can position one eye in the first viewing area and another eye in the second viewing area to observe parallax differences between the first image and the stream of images when selecting the second image.

In another aspect, an imaging method is provided. In accordance with the method a first image of a scene is captured and the first image is presented to a first viewing area while a stream of images is presented to a second viewing area whereby an observer can detect parallax differences between the first image and the stream of images.

DETAILED DESCRIPTION OF THE INVENTION

Camera

Figure 1:
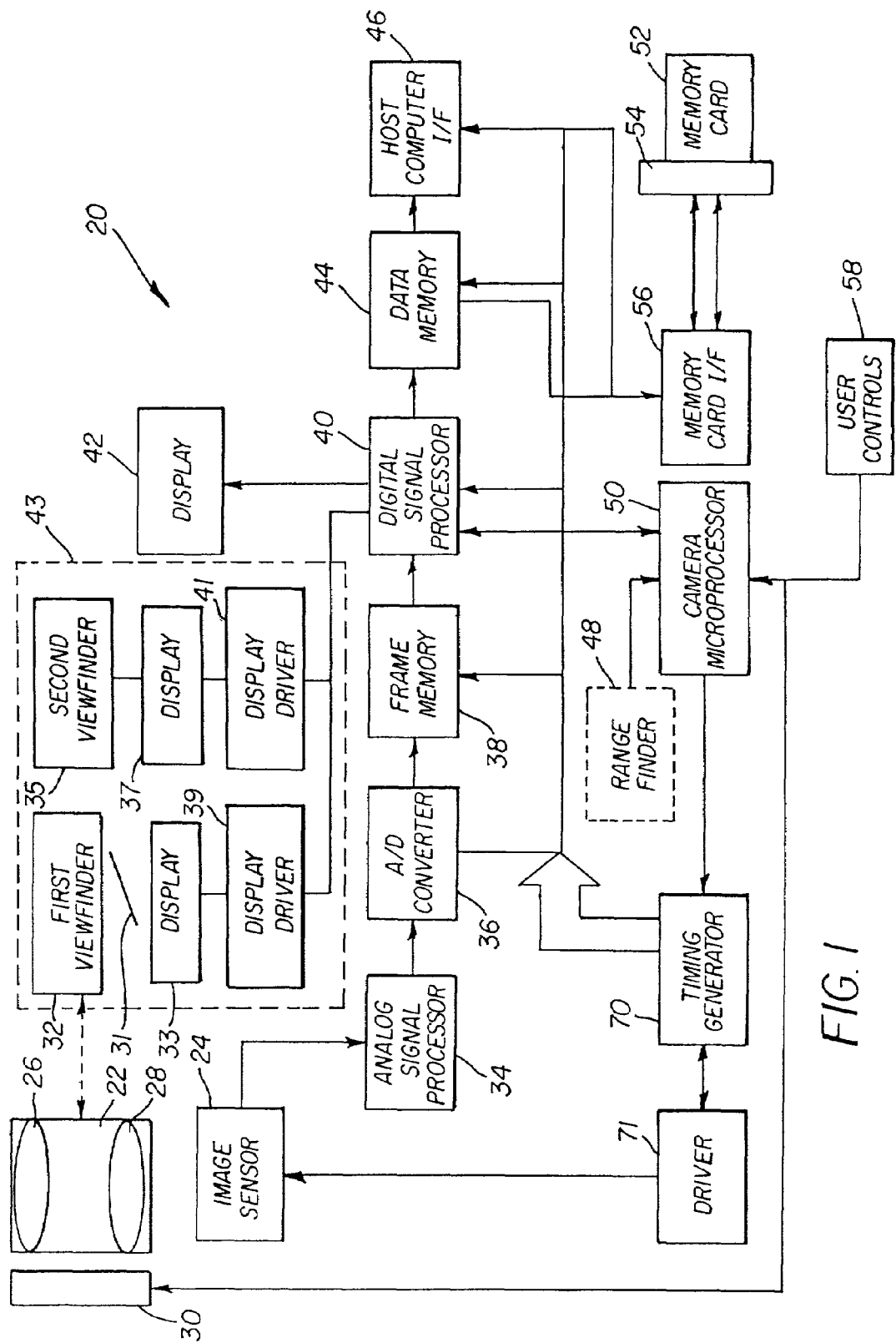
FIG. 1 shows a block diagram of an embodiment of a camera.

FIG. 1 shows a block diagram of an embodiment of a camera 20. As is shown in FIG. 1, camera 20 includes a taking lens unit 22, which directs light from a scene (not shown) to form an image on image sensor 24.

The taking lens unit 22 can be simple, such as having a single focal length and manual focusing or a fixed focus, but this is not preferred. In the example embodiment shown in FIG. 1, the taking lens unit 22 is a motorized 2x zoom lens unit in which a mobile element or elements 26 are driven, relative to a stationary element or elements 28 by lens driver 30. Lens driver 30 controls both the lens focal length and the lens focus position of taking lens unit 22. As is shown in this embodiment, camera 20 has a first viewfinder 32.

In the embodiment shown, first viewfinder 32 incorporates an electronic display 33 that receives electronically captured and processed images and provides these images to the user of camera 20 so that the user can make decisions regarding the composition of the scene. Display 33 can comprise, for example, a reflective Liquid Crystal Display (LCD). Some examples of reflective LCDs that can be used are the SXGA-R2-1, SXGA-R2-H1, and/or SXGA-R2-H2 microdisplays sold by CRL Opto Ltd., Dalgety Bay, Dunfermline, Scotland, U.K. Display 33 can also comprise an organic electroluminescent display (OELD) also known as an organic light emitting display (OLED). Examples of OLED displays useful in this embodiment are the SVGA+ and SVGA 3D displays sold by Emagine Corp. Hopewell Junction, N.Y., U.S.A.

In another embodiment, first viewfinder 32 can selectively present images obtained optically from taking lens unit 22 and can also present images that appear on electronic display 33. This allows a user to look through first viewfinder 32 to observe the scene in an optical viewfinder mode and also allows the user to later observe digitally captured images that are presented using the display. In this embodiment, display 33 can also comprise a transmissive Liquid Crystal Display. One example of such a display is the 640 color display sold by Kopin Corporation, Tauton, Mass., USA. A movable mirror 31 is selectively placed in the optical path between the eye of an observer and display 33. In one position, the mirror 31 causes light from taking lens unit 22 to be presented to the eye of an observer. Typically, when mirror 31 is so positioned, mirror 31 prevents light from display 33 from traveling to the eye of an observer. This prevents confusion as to what is being observed. When mirror 31 is moved to another position, light from taking lens unit 22 is no longer presented to the eye of the observer, and light from display 33 is presented. In an optical viewing mode mirror 31 is moved into the optical path.

Auto Focus

Various methods can be used to determine the focus settings of the taking lens unit 22. In a preferred embodiment, the image sensor 24 is used to provide multi-spot autofocus using what is called the "through focus" or "whole way scanning" approach. The scene is divided into a grid of regions or spots, and the optimum focus distance is determined for each image region. The optimum focus distance for each region is determined by moving taking lens unit 22 through a range of focus distance positions, from the near focus distance to the infinity position, while capturing images. Depending on the camera design, between four and thirty two images may need to be captured at different focus distances. Typically, capturing images at eight different distances provides suitable accuracy.

The captured image data is then analyzed to determine the optimum focus distance for each image region. This analysis begins by band-pass filtering the sensor signal using one or more filters, as described in commonly assigned U.S. Pat. No. 5,874,994 "Filter Employing Arithmetic Operations for an Electronic Synchronized Digital Cameras" filed by Xie et al., the disclosure of which is herein incorporated by reference. The absolute value of the band-pass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture the final high-resolution still image can now be determined. In a preferred embodiment, the image regions corresponding to a target object (e.g. a person being photographed) are determined. The focus position is then set to provide the best focus for these image regions, as described in commonly assigned U.S. Pat. No. 5,877,809 "Method Of Automatic Object Detection In An Image", filed by Omata et al. on Oct. 15, 1976, the disclosure of which is herein incorporated by reference. If the target object is moving, object tracking may be performed, as described in commonly assigned U.S. Pat. No. 6,067,114 "Detecting Compositional Change in Image" filed by Omata et al. on Oct. 24, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Feb. 3, 1998, the disclosure of which is herein incorporated by reference.

In a preferred embodiment, the band-pass filtering and other calculations used to provide autofocus in camera 20, are performed by digital signal processor 40. In one such embodiment, camera 20 uses a specially adapted image sensor 24, as is shown in commonly assigned U.S. Pat. No 5,668,597, entitled "Electronic Camera With Rapid Autofocus Upon An Interline Image Sensor", filed by Parulski et al. on Sep. 16, 1997, the disclosure of which is herein incorporated by reference, to automatically set the lens focus position. As described in the '597 patent, only some of the lines of sensor photoelements (e.g. only ¼ of the lines) are used to determine the focus. The other lines are eliminated during the sensor readout process. This reduces the sensor readout time, thus shortening the time required to focus taking lens unit 22.

In an alternative embodiment, camera 20 uses a separate optical or other type (e.g. ultrasonic) of range finder 48 to identify the subject of the image and to select a focus position for taking lens unit 22 that is appropriate for the distance to the subject. Range finder 48 operates lens driver 30, directly or by camera microprocessor 50, to move one or more mobile elements 26 of taking lens unit 22. The range finder 48 can be passive or active or a combination of the two. A wide variety of suitable multiple sensor range finders 48 known to those of skill in the art are suitable for use. For example, U.S. Pat. No. 5,440,369, entitled "Compact Camera With Automatic Focal Length Dependent Adjustments" filed by Tabata et al. on Nov. 30, 1993, discloses such a range finder 48. A feedback loop is established between lens driver 30 and camera microprocessor 50 so that camera microprocessor 50 can accurately set the focus position of taking lens unit 22. The focus determination provided by the range finder 48 can be of the single-spot or multi-spot type. Preferably, the focus determination uses multiple spots. In multi-spot focus determination, the scene is divided into a grid of regions or spots, and the optimum focus distance is determined for each spot and a focus determination is made by identifying the spot or set of spots that are associated with the subject of the image.

Image Capture

Image sensor 24 has a discrete number of photosensitive elements arranged in a two-dimensional array. When the analog signal values from each photosensitive element are digitized by the analog-to digital (A/D) converter 36, they provide the pixel values of the captured digital image. Thus, each individual photosite on image sensor 24 corresponds to one pixel of the captured digital image, referred to herein as an archival image. Image sensor 24 can be either a conventional charge coupled device (CCD) sensor or a complementary metal oxide semiconductor image sensor. In one example embodiment, image sensor 24 has an array of 1280×960 photosensitive elements. The photosensitive elements, or photosites, of image sensor 24 convert photons of light from the scene into electron charge packets. Each photosite is overlaid with a color filter array, such as the Bayer color filter array described in commonly assigned U.S. Pat. No. 3,971,065, entitled "Color Imaging Array" filed by Boyer on Mar. 5, 1975, the disclosure of which is herein incorporated by reference. The Bayer color filter array has 50% green pixels in a checkerboard mosaic, with the remaining pixels alternating between red and blue rows. The photosites respond to the appropriately colored incident light illumination to provide an analog signal corresponding to the intensity of illumination incident on the photosites.

The analog output of each pixel is amplified and analog processed by an analog signal processor 34 to reduce the output amplifier noise of image sensor 24. The output of the analog signal processor 34 is converted to a digital image signal by an A/D converter 36, such as, for example, a 10-bit bit A/D converter which provides an 10 bit signal in the sequence of the Bayer color filter array.

The digitized image is temporarily stored in a frame memory 38, and is then processed using a programmable digital signal processor 40 as described in commonly assigned U.S. Pat. No. 5,016,107 entitled "Electronic Still Camera Utilizing Image Compression and Digital Storage" filed by Sasson et al. on May 9, 1989, the disclosure of which is herein incorporated by reference. The image processing includes an interpolation algorithm to reconstruct a full resolution color image from the color filter array pixel values using, for example, the methods described in commonly assigned U.S. Pat. No. 5,373,322 entitled "Apparatus and Method for Adaptively Interpolating a Full Color Image Utilizing Chrominance Gradients" filed by LaRoche et al. on Jun. 30, 1993, and U.S. Pat. No. 4,642,678 entitled "Signal Processing Method and Apparatus for Producing Interpolated Chrominance Values in a Sampled Color Image Signal", filed by Cok on Feb. 10, 1987, the disclosures of which are herein incorporated by reference. White balance, which corrects for the scene illuminant, is performed by multiplying the red and blue signals by a correction factor so that they equal green for neutral (i.e. white or gray) objects. Preferably, color correction uses a 3×3 matrix to correct the camera spectral sensitivities. However, other color correction schemes can be used. Tone correction uses a set of look-up tables to provide the opto-electronic transfer characteristic defined in the International Telecommunication Union standard ITU-R BT.709. Image sharpening, achieved by spatial filters, compensates for lens blur and provides a subjectively sharper image. Luminance and chrominance signals are formed from the processed red, green, and blue signals using the equations defined in ITU-R BT.709.

After this processing is complete, the image can be compressed for archival purposes and stored in a data memory 44. In one embodiment, the Joint Photographic Experts Group (JPEG) standard specified in ISO 10918-1 (ITUT.81) is used to compress the image for archival storage. The compression uses the well-known discrete cosine transform (DCT) to transform 8×8 blocks of luminance and chrominance signals into the spatial frequency domain. These DCT coefficients are then quantized and entropy coded to produce the JPEG compressed image data. This JPEG compressed image data is stored in a file using the so-called "Exif" image format defined in "Digital Still Camera Image File Format (Exif)" version 2.1, July 1998 by the Japan Electronics Industries Development Association Tokyo, Japan. The Exif format archival image can be stored in a memory card 52. In the embodiment of FIG. 1, camera 20 is shown having a memory card slot 54 which holds a removable memory card 52 and has a memory card interface 56 for communicating with memory card 52. The Exif format archival image can also be transmitted to a host computer (not shown), which is connected to camera 20 through a host computer interface 46.

Forming and Displaying a Verification Image

The digital signal processor 40 also creates a smaller size digital image for display on an image display 42. This image is referred to herein as a verification image. Image display 42 can comprise, for example, a color liquid crystal display (LCD), an organic electroluminescent display (OELD) also known as an organic light emitting display (OLED), a cathode ray tube or other type of video display. The verification image is preferably created and displayed immediately after the archival image is captured, and can be created, for example, by conventional down sampling and/or other techniques described in commonly assigned U.S. Pat. No. 5,164,831 "Electronic Still Camera Providing Multi-Format Storage Of Full And Reduced Resolution Images" filed in the name of Kuchta et al. on Mar. 15, 1990, the disclosure of which is herein incorporated by reference. This verification image is stored in data memory 44 and supplied, for example, to image display 42, which displays the smaller sized, processed verification image for the user to review.

Figure 2:
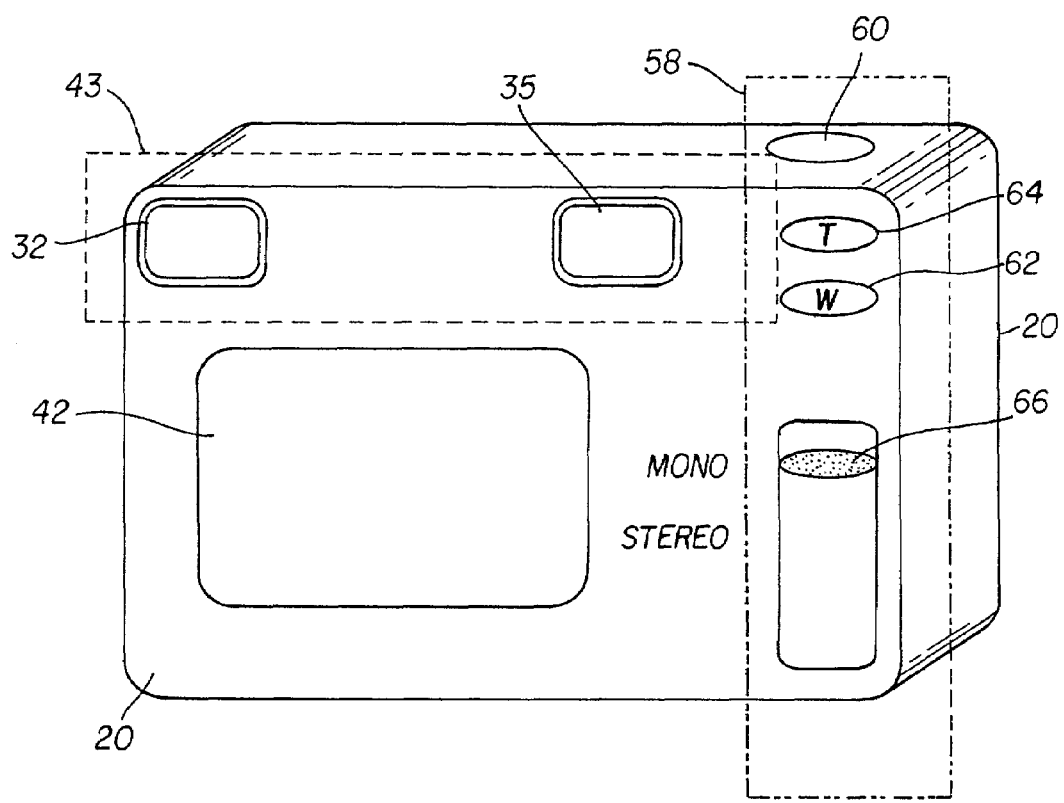
FIG. 2 illustrates one embodiment of a camera of the present invention.

Camera 20 is controlled by user controls 58, some of which are shown in more detail in FIG. 2. User controls 58 include a shutter release 60 which initiates a picture taking operation, along with a "wide" zoom lens button 62 and a "tele" zoom lens button 64, which in this embodiment together control both a 2:1 optical zoom and a 2:1 digital zoom feature. The optical zoom is provided by taking lens unit 22, and adjusts the magnification in order to change the field of view of the focal plane image captured by the image sensor 24. The digital zoom is provided by the digital signal processor 40, which crops and resamples the captured image stored in the frame memory 38. When the user first turns on the camera 20, the zoom lens is set to the 1:1 position, so that all sensor photoelements are used to provide the captured image, and the taking lens unit 22 is set to the wide angle position. In a preferred embodiment, this wide angle position is equivalent to a 40 mm lens on a 35 mm film camera. This corresponds to the maximum wide angle position.

When the user then depresses the "tele" zoom lens button 64, the taking lens unit 22 is adjusted by the camera microprocessor 50 via the lens driver 30 to move the taking lens unit 22 towards a more telephoto focal length. If the user continues to depress the "tele" zoom lens button 64, the taking lens unit 22 will move to the full optical 2:1 zoom position. In a preferred embodiment, this full telephoto position is equivalent to a 40 mm lens on a 35 mm film camera. If the user continues to depress the "tele" zoom lens button 64, the taking lens unit 22 will remain in the full optical 2:1 zoom position, and digital signal processor 40 will begin to provide digital zoom, by cropping (and optionally resampling) a central area of the image.

Image display 42 is provided on the back of camera 20 and is sized to permit a user to use the display to interact with camera 20 while holding camera 20 at a convenient viewing distance from the face of the user. Typically image display 42 will be rectangular in form and on the order of 3.5 cm to 5.1 cm in diagonal measure. However, other shapes and sizes of image display 42 can be used.

Typically, image display 42 has a lower imaging resolution than image sensor 24. The term resolution is used herein to indicate the number of picture elements used to represent the image. For example, displays of the type that are commonly used on digital cameras typically provide 320×240 display elements, which correspond to an image display resolution of about 0.08 megapixels. However, in camera 20 of FIG. 1, the captured image can be derived from a high resolution image sensor 24, having for example 1280×960 photosites, corresponding to about 1.25 megapixels. Thus, in this example, there are 16 times more sensor elements than display elements and the resolution of a captured image is 16 times greater than the resolution of image display 42.

Camera 20 also incorporates a depth viewer 43. Depth viewer 43 comprises a display system that is capable of selectively displaying a first verification image to a first viewing area positioned such that the first viewing area can be seen by only one eye of a user and a second verification image to a second viewing area positioned such that the second viewing area can be seen by only another eye of a user. In the embodiment shown, depth viewer 43 is of a binocular type having separate optical systems comprising a first viewfinder 32 and a second viewfinder 35. In this embodiment, second viewfinder 35 is adapted with a second display 37. Second display 37 can for example comprise an LCD or OLED display or any other form of electronic display that can be conveniently incorporated into camera 20. First display 33 and second display 37 are operated by display drivers 39 and 41 respectively. Display drivers 39 and 41 receive images from digital signal processor 40 and cause first viewfinder 32 and second viewfinder 35 to present one image to a first viewing area confronting one eye of an observer and another image to a second viewing area confronting another eye of the observer.

Typically, the verification images presented by depth viewer 43 will have an imaging resolution that is substantially lower than the resolution of the captured images upon which verification images are based. Accordingly, it is necessary to resample the captured image into a verification image having a suitably small image size so that it can be displayed at the image resolution provided by image display 42 or depth viewer 43. This resampling can be done by using low pass filtering, followed by sub-sampling, or by using bilinear interpolation techniques with appropriate anti-aliasing conditioning. Other techniques known in the art for adapting a high resolution image for display on a relatively low resolution display can alternatively be used.

The resampling of the captured image to produce a verification image having fewer pixels (i.e. lower resolution) than the captured image is performed by digital signal processor 40. As noted earlier, the digital signal processor 40 also provides digital zooming. In the maximum 2:1 setting, the digital signal processor 40 uses the central 640×480 sensor area to provide the archival image by interpolating this central area up to 1280×960 samples.

The digital signal processor 40 can also modify the archival image in other ways so that the verification image matches the appearance of the archival image. These include color calibrating the verification image so that when the verification image is presented on the display, the displayed colors of the verification image appear to match the colors in the archival image. These and other modifications help to provide the user with an accurate representation of the color, format, scene content and lighting conditions in the captured image.

In camera 20 of FIGS. 1 and 2, an archival image is typically captured using image sensor 24 when the user depresses the shutter release 60. In response, a capture sequence is then initiated by camera microprocessor 50 signaling a timing generator 70. The timing generator 70 is connected generally to the elements of camera 20, as shown in FIG. 1, for controlling the digital conversion, compression, and storage of the image signal. The image sensor 24 is driven from the timing generator 70 via a sensor driver 71 to produce the image signal provided to analog signal processor 34.

Forming and Displaying a Multi-Perspective Image: Stereo Capture

Figure 3:
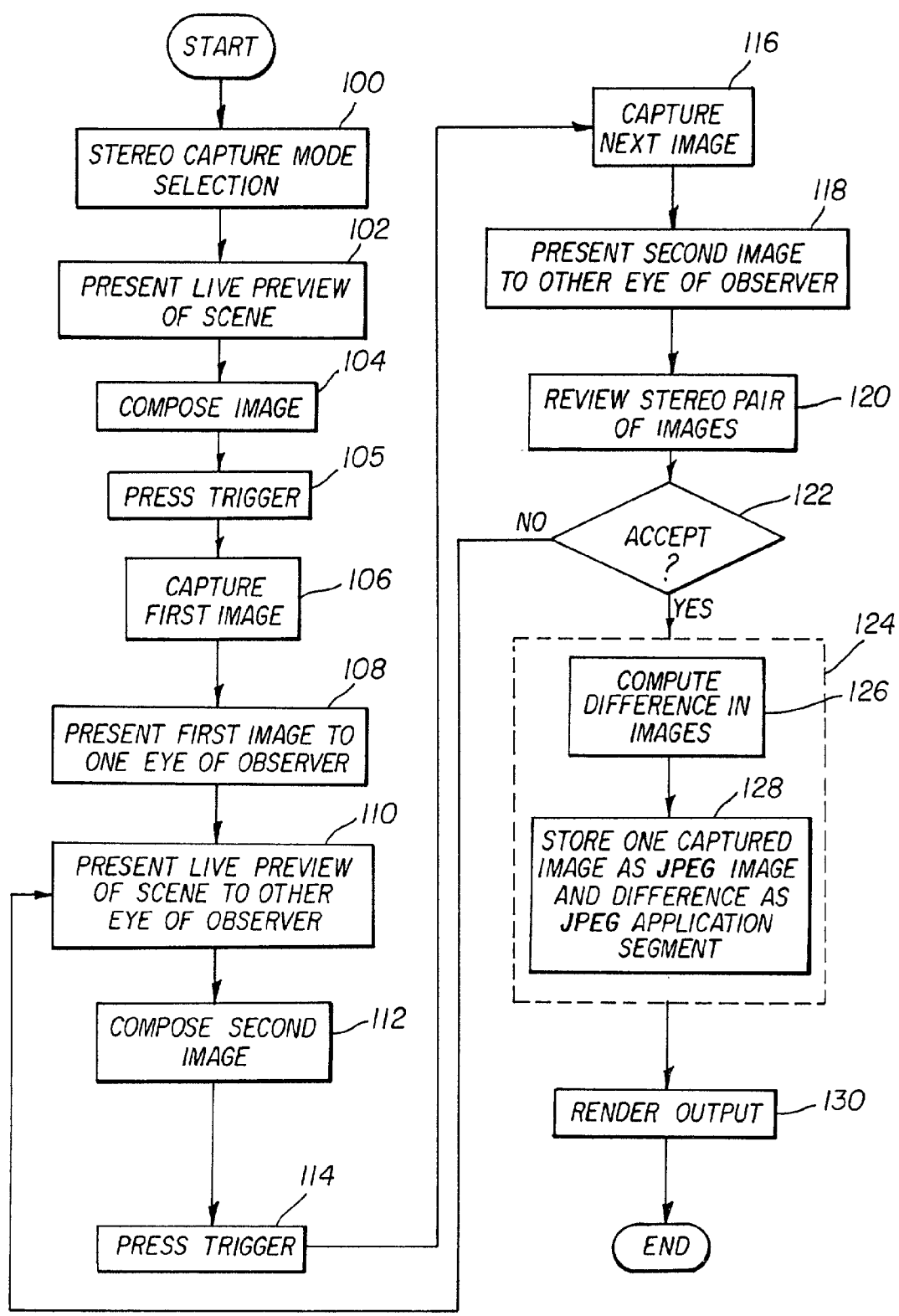
FIG. 3 shows a flow diagram embodiment of a method for using a camera to form a stereo or two-perspective depth image of a scene.
Figure 4:
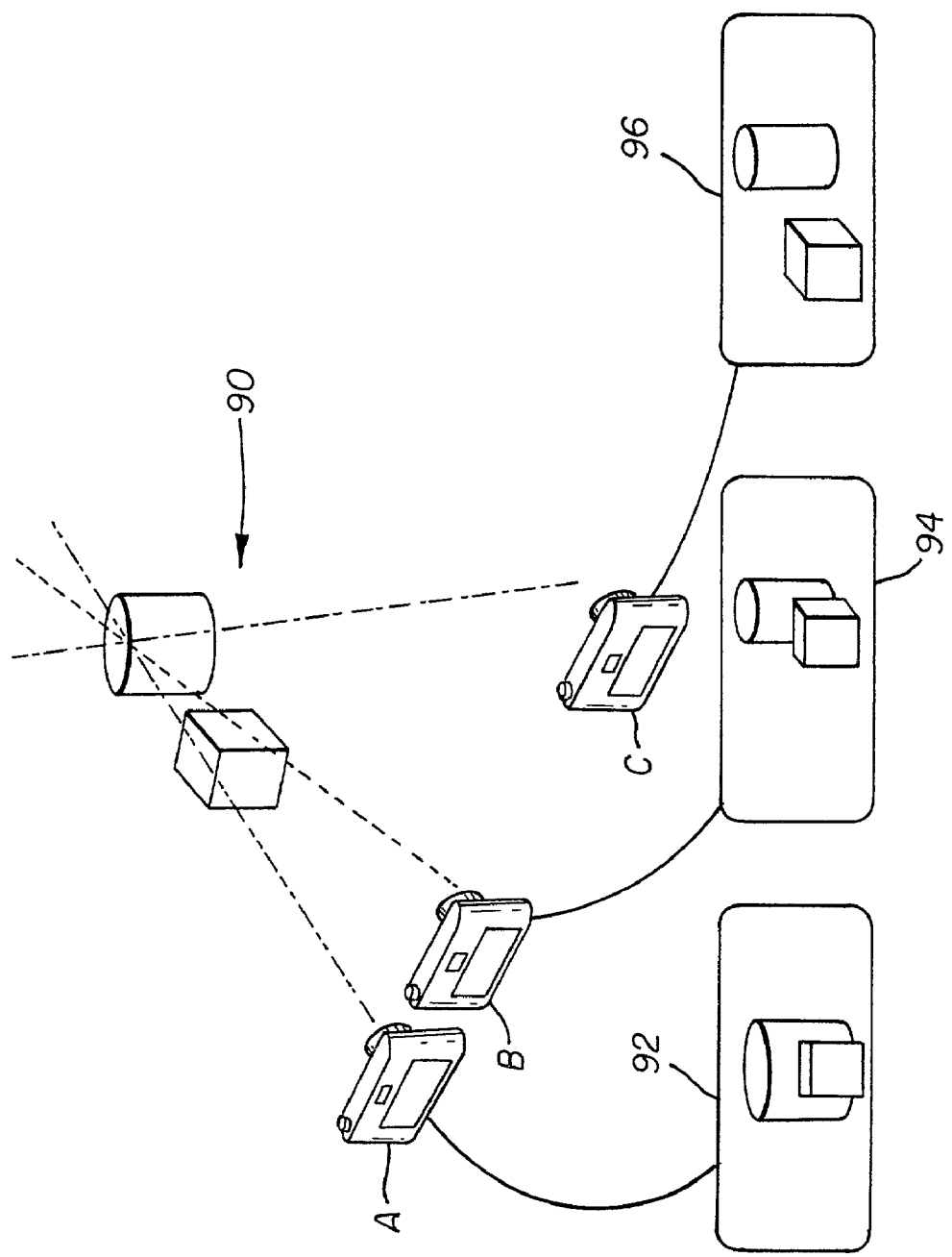
FIG. 4 illustrates the capture of images of a scene from various perspectives and the effect that changing perspectives has on the content of scanning of the scene.

FIG. 3 shows a flow diagram of an embodiment of a method for using a camera 20 to form a stereo or two-perspective depth image of a scene 90 shown in FIG. 4. In the first step of this method a camera user indicates a desire to record a stereo image—(step 100). A stream of images of the scene is presented to one or both of the eyes of the user of camera 20—(step 102). This can be done optically using first viewfinder 32, second viewfinder 35, image display 42, depth viewer 43 or a combination thereof. The user of camera 20 uses the stream of images to position camera 20 to compose a first image of scene 90—(step 104) for example by adjusting the zoom buttons 62, 64 while aiming the camera in a desired direction. The trigger button is then pushed (step 105) to indicate a desire to capture an image of the scene. The first image is then captured, for example, when camera 20 is located at position A—(step 106). The image capture can, for example, occur in response to the user depression of shutter release 60. The image capture can also be initiated by camera microprocessor 50, for example, in response to user programmed delays or time lapses. Prior to capturing the first image, the camera microprocessor 50 can perform an autofocus operation, as described earlier.

A first image 92 is processed as was described earlier, and a verification image based on the first captured image is then presented to only one of the eyes of the user, for example, the user's left eye—(step 108). The stream of images from the scene is then presented to the other one of the eyes of the user, for example, the user's right eye. In this way, one eye of the user sees only the first image 92 while the other eye sees the stream of images—(step 110). To the extent that the angle of view between camera 20 and scene 90 for the first image 92 is different than the angle of view between camera 20 and the scene 90 for the stream of images, parallax induced differences will exist between the first image 92 and the stream of images. The mind of the user interprets these parallax induced differences as depth in the image. This provides a live preview of the scene including the apparent depth in the scene and allows the user to compose an image of the scene having the desired amount of apparent depth—(step 112). In some embodiments, in order to maintain the consistency between the first and second captured images, the operation of the zoom buttons 62, 64 are disabled when previewing and capturing the second image, so that the same zoom setting is used to capture the first and second images. Further, the autofocus operation is performed only when capturing the first image, and the focus is locked when capturing the second image, so that the focus distance is the same for both images.

Once the user determines a camera position, for example position B, for capturing a particular combination of images that provides the desired appearance, the user depresses shutter release 60—(step 114) This causes a second image 94 to be captured—(step 116). Both the first image 92 and second image 94 are simultaneously presented to the user—(step 118). It will be observed that both first image 92 and second image 94 contain the same scene elements, but have different appearances because of the difference in viewing angle. This allows the user to review the appearance of the pair of images 92 and 94 image in stereo—(step 120) and to determine whether the stereo image pair has an acceptable appearance—(step 122).

If the user determines that the appearance of stereo image pair is not acceptable, then the user of camera 20 can discard the second image 94 and capture a new second image. In this case, the process returns to displaying the first image to one eye of the user (step 110) while presenting a live preview of the scene to the other eye of the observer (step 110) in order to compose a second image—(step 112). This allows the user to recompose the second image of the scene to modify the apparent depth, and to create a new image incorporating, for example, first image 92 and a third image 96 captured with camera 20 at point C in FIG. 4. First image 92 and third image 96 are then stored as an archival image pair from which a stereoscopic depth image can be rendered.

After a stereo pair is accepted, the selected archival image pair can be further processed—(step 124). Such further processing can comprise digital manipulation and storage of the images. In the embodiment shown, the selected archival image pair 92 and 96 are further processed by forming a differential image that represents the differences between the first archival image and the second archival image—(step 126). This can be done, for example, by subtracting the pixel values of third image 96 from the pixel values of the first image 92. The advantage of this approach is that the differential image can normally be compressed to be much smaller in size than one of the compressed archival images. Further, the differential image can be used to locate areas in the archival images having significant stereoscopic depth. In some embodiments, the differential image is stored along with the first archival image in a single image file. For example, the differential image information can be stored within one or more application segments in a JPEG file containing the first image (or alternatively the second image) in accordance with the JPEG standard format ISO 10918-1 (ITU—T.81) (Step 128). This allows a single, industry standard image file to contain both the JPEG compressed first image stored as a normal JPEG image, and the compressed differential image data, that is stored as proprietary data which is ignored by normal JPEG readers.

This approach further allows the stored first image to be used, processed, and displayed using software and equipment which support the present standard JPEG images while still permitting the first image and associated differential image data stored in the application segment to be used for creating a multi-perspective image by software and equipment adapted for such a purpose.

Alternatively the selected archival image pair can be stored as two separate standard image files, in either compressed or uncompressed form. Metadata can be encoded with each image, for example, using a JPEG application segment associated with each of the JPEG images with the metadata indicating that the images are to be incorporated into a multi-perspective image. In another alternative, the archival image pair can be stored as first and second images in the same non-standard image file. The two images 92 and 96 can then be extracted from the file in a manner that separates imaging information that is to be presented to one eye of the user from imaging information that is to be presented to the other eye of the user.

In another alternative, archival image pair can be further processed to form a single composite image file so that they can be presented together using an appropriate display. In an optional rendering step (step 130) this composite image is displayed using a depth image display, which uses lenticular, micro-lens or barrier type optical systems to present slightly different scene information to each of the viewer's eyes as will be described later.

Multi-Perspective Imaging: Look Around Image

As described above, it is known to combine imaging information from two or more images of a scene that are captured from different perspectives to form multi perspective image displays having depth with a look around effect. These images can be integrated to form a single two dimensional image that, when viewed using lenticular, micro-lens or barrier type optical systems, presents different scene information to each of the viewer's eyes and that changes the scene information presented to the user's eyes as the viewer's visual perspective advances along an axis in front of the depth image display. This effect, called a look around effect, occurs because each eye is presented with a different image or view of the scene and as the position of the eyes are moved relative to the depth image, the pair of images that are presented to each eye changes. The task of composing an image having a desired look around effect is greatly simplified by providing a camera 20 that demonstrates the look around effect during composition.

Figure 5:
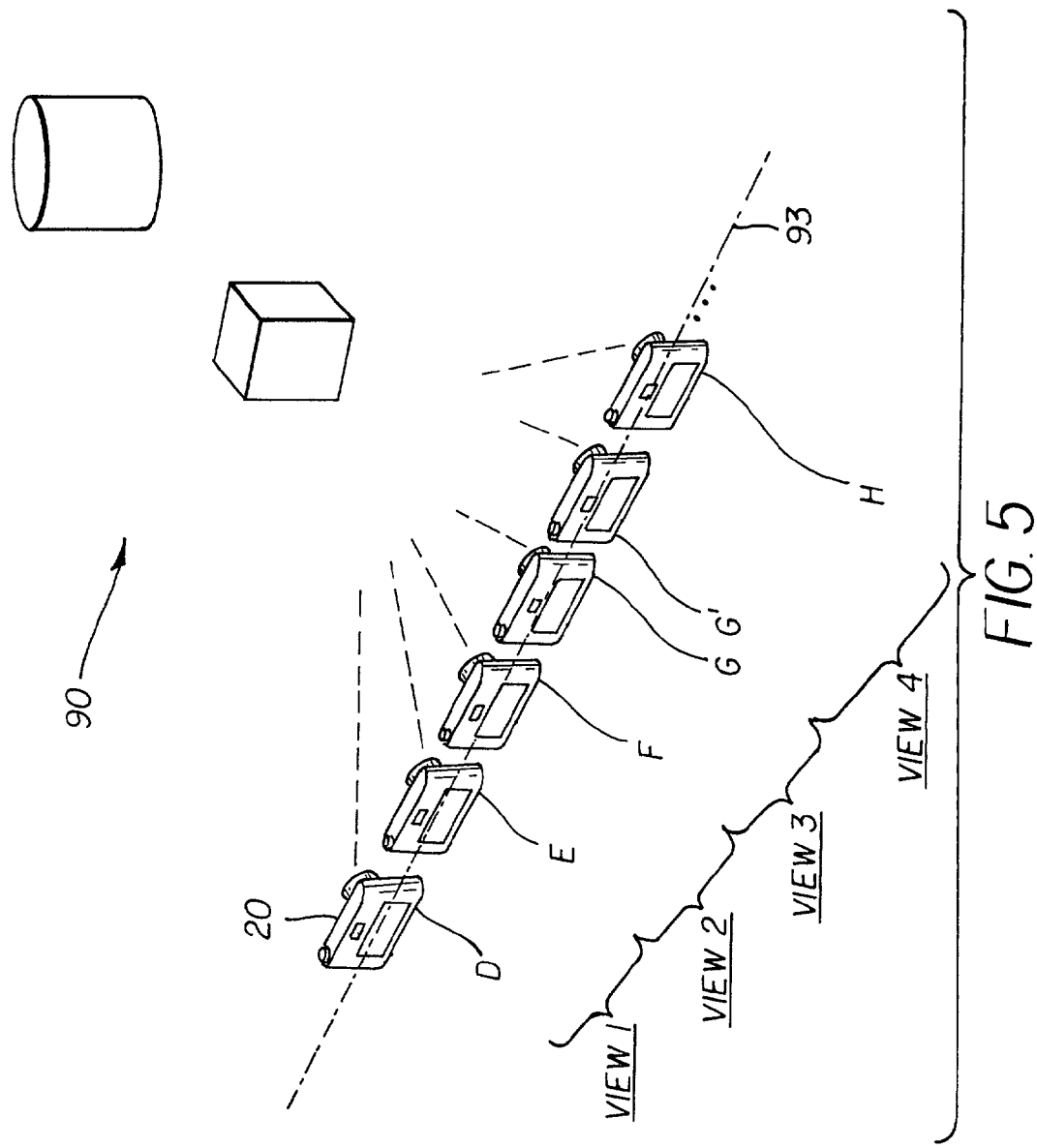
FIG. 5 illustrates the capture of images of a scene from various perspectives.

As illustrated in FIG. 5, depth images having a look around effect can be formed by positioning a camera 20 to capture a series of views from different perspectives. As illustrated, several perspective images of scene 90 from different viewpoints are captured as a first view series by positioning camera 20 at, for example, positions D, E, F, G and H arranged along a capture axis 93. Any number of positions greater than two can be used to form a depth image having a look around effect. Each additional image can be used to increase the extent of the overall look around effect.

Figure 6:
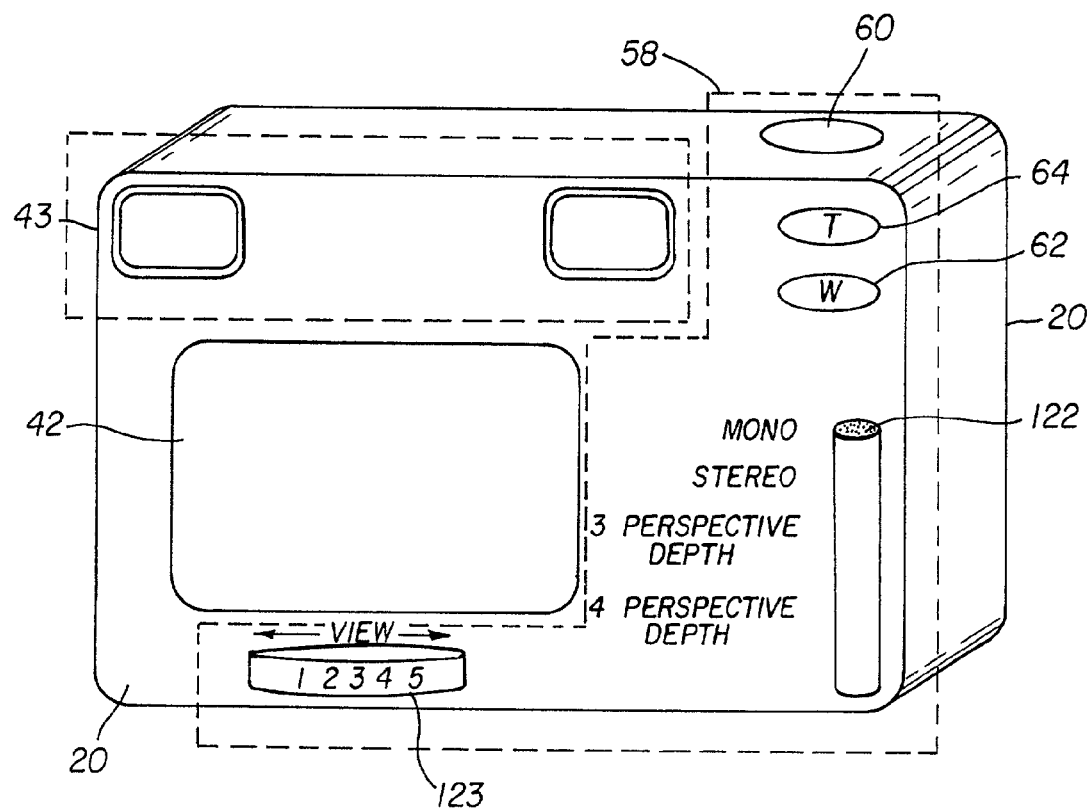
FIG. 6 illustrates an embodiment of a camera in accordance with the invention.

FIG. 6 illustrates an embodiment of camera 20 having a look around position control 123 that allows the user to select the number of images n to be incorporated in a series of images that are used to form a depth image. This allows a particular number of separate perspective images to be captured in an image capture mode. In the first step of this embodiment, the number of images n in the series of images to be captured is detected. A first image pair comprising a first archival image and a second archival image is then composed and captured using the method described for forming a stereo image as described above with respect to FIG. 3. Subsequent images in the sequence are composed by presenting one eye of the user of camera 20 with a verification image of the last captured archival image and another eye of the user with a stream of images of the scene and capturing additional images based upon imaging information from the last captured image and the stream of captured images.

The sequence of images is then presented in pairs of sequential verification images to the user of camera 20 using depth viewer 43. For example, in the embodiment shown in FIG. 5, a set of five images is captured from positions D, E, F, G and H. This provides four depth views of scene 90 and therefore provides look around capability. In view 1, imaging information from images captured at positions D and E is used to generate a depth image. Similarly, in view 2, imaging information from images captured at positions E and F are used to generate a second depth view of scene 90, while in view 3 camera imaging information from images captured at positions F and G are used to generate a view 3 of scene 90 and imaging information from images captured at positions G and H are used to generate view 4 of scene 90.

As is shown in this embodiment, the camera positions D, E, F and G are separated by the same distance. Accordingly, the change in perspective observed in the look around effect generated as a viewer transitions from the first depth view of scene 90 to the second depth view of scene 90 to the third depth view of scene 90 will appear to be constant. However, as is also shown in FIG. 5, the separation between positions G and H is greater than the distance that separates positions D, E, F and G. Because of this, the change in apparent perspective observed as the viewer transitions from view 3 of the scene to view 4 of the scene will not appear to be constant. This provides the photographer with greater creative control in the formation of a look around image.

However, for the photographer to fully appreciate the look around effect while at the scene of the photograph, it is important the photographer can examine views in depth and in context. Camera 20 and depth viewer 43 are adapted to allow the user of camera 20 to simulate an angle of view so that particular pairs of verification images can be examined in context with other pairs of verification images.

In the embodiment of camera 20 shown in FIG. 6, user controls 58 include a look around position control 123. Look around position control 123 provides an input to camera microprocessor 50 that causes selected ones of the set of depth views to appear in sequence on depth viewer 43. For example, when depth viewer 43 is activated to provide a preview of the captured look around depth images, depth viewer 43 will display imaging information from a selected view of the scene such as view 1. In the embodiment discussed above, view 4 incorporates imaging information from images captured, for example, at positions F and G. A user of camera 20 can modify the position of look around position control 123 to cause depth viewer 43 to selectively display imaging information from other views using depth viewer 43. This permits the photographer to review each view and to make decisions regarding whether to replace imaging information captured, for example, from position G with imaging information captured at, for example, position G' shown in FIG. 5.

Depth Viewer—Non-Binocular Embodiment

Figure 7:
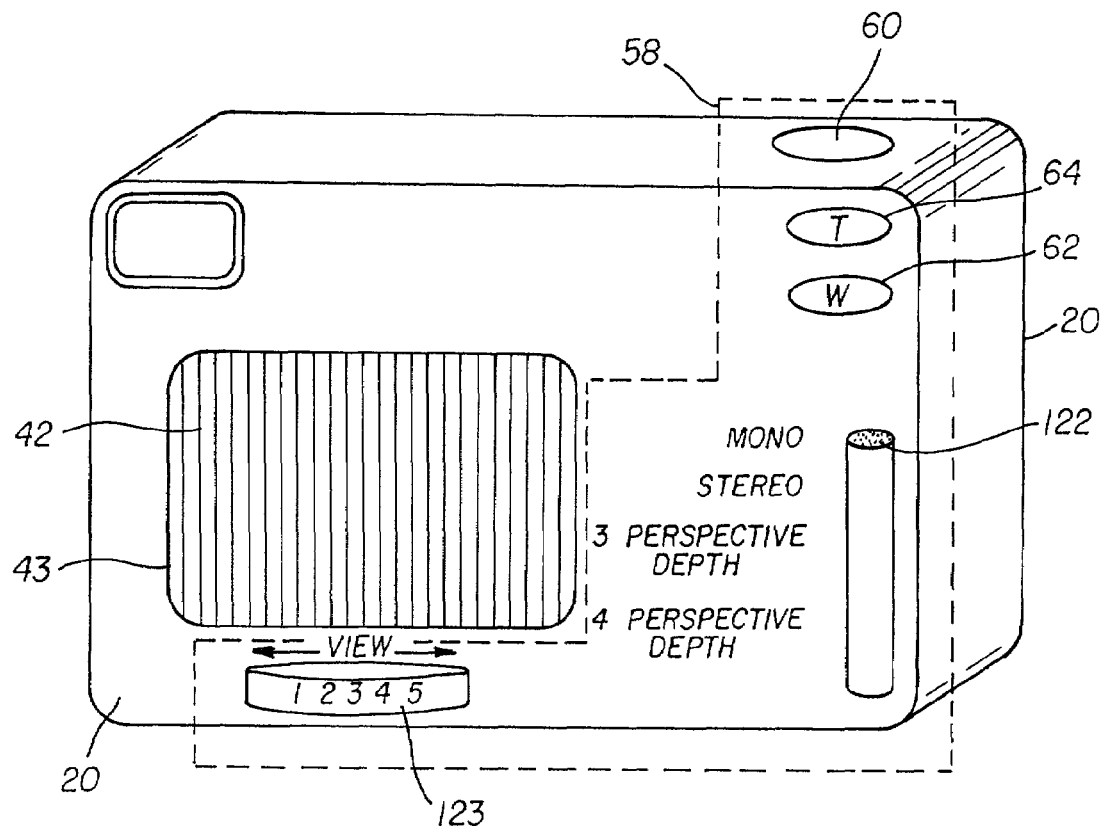
FIG. 7 illustrates yet another embodiment of a camera in accordance with the invention.
Figure 8:
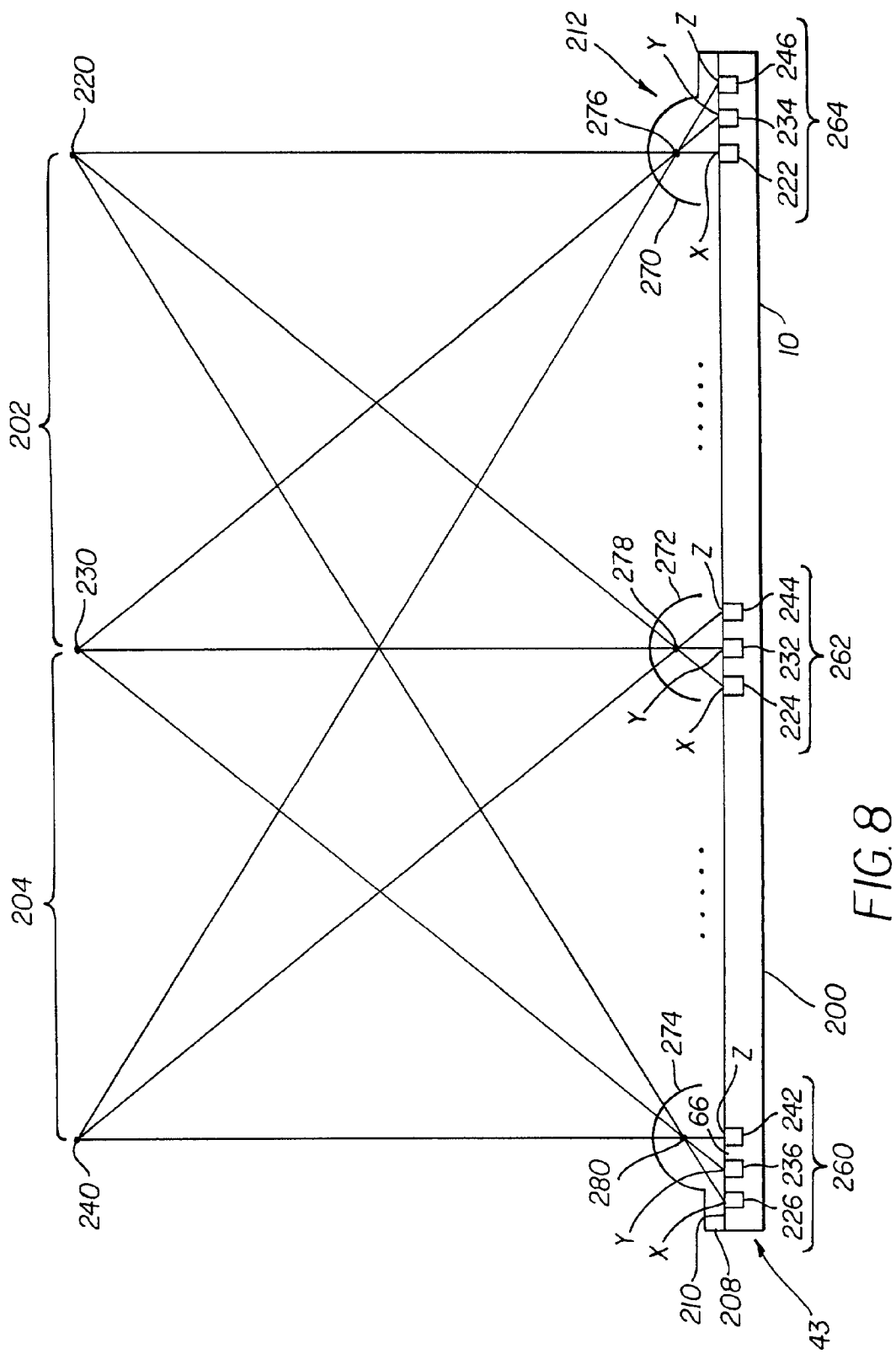
FIG. 8 illustrates one embodiment of a depth viewer in accordance with the invention.
Figure 9:
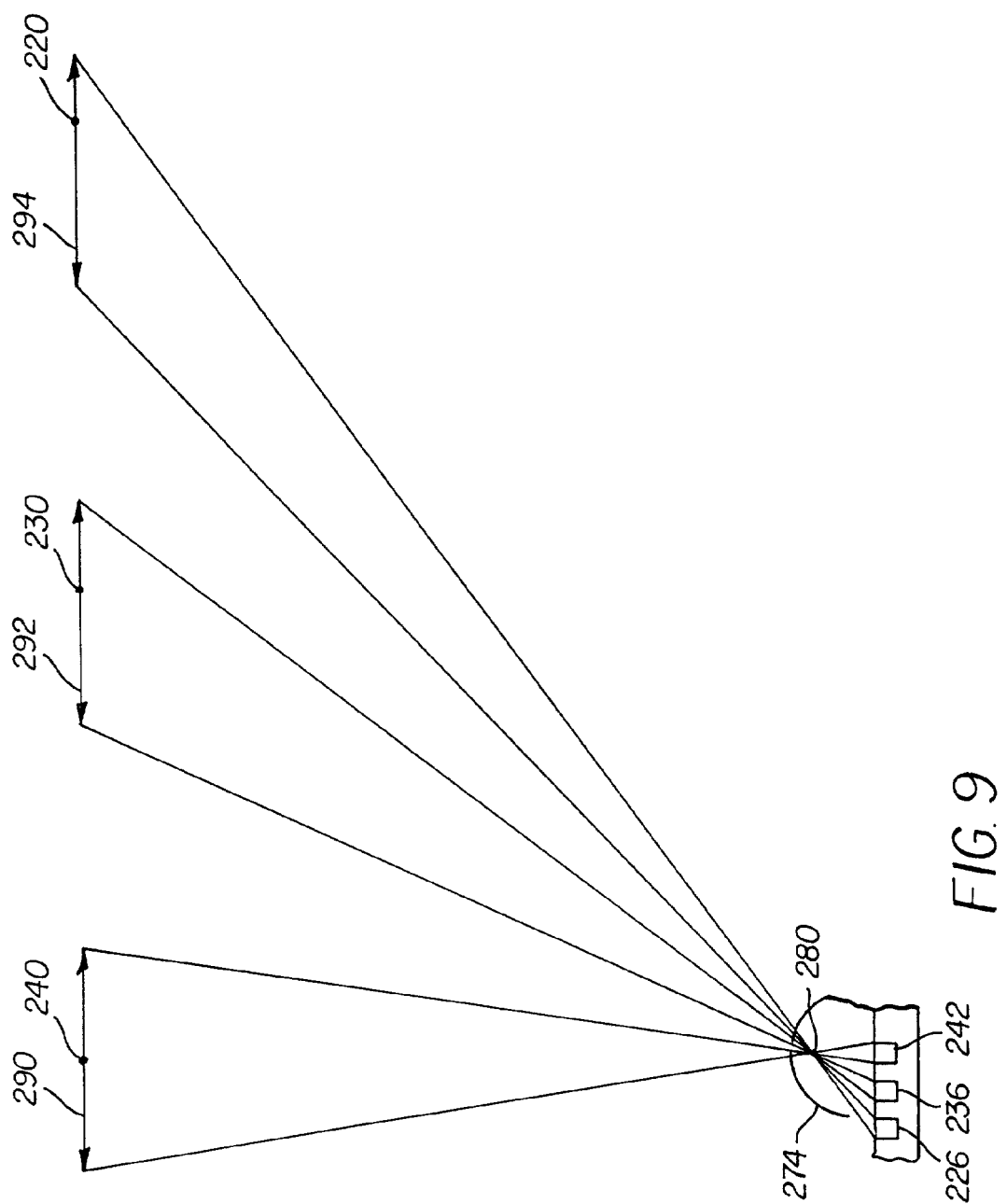
FIG. 9 illustrates the viewing ranges for the content groups associated with one lenticule of FIG. 8.

FIG. 7 shows another embodiment of camera 20 of the present invention having a non-binocular depth viewer 43. An example of such a combination is described in commonly assigned U.S. Pat. No. 5,715,383 entitled "Compound Depth Image Display System" filed by Schindler et al. on Sep. 28, 1992. FIGS. 8 and 9 illustrate the operation of this depth viewer. In this embodiment depth viewer 43 comprises a display 200 and a depth image projection device 208. In the embodiment shown, display 200 generally has a flat display surface 210 on which images are formed. Display 200 can comprise, for example, an active matrix liquid crystal display or an organic light emitting display, or conventional cathode ray tube display. The images formed on flat display surface 210 are viewed through a depth image projection device 208 such as a lenticular screen 212 comprising a plurality of lenticules 270 attached to the flat display surface 210. In this embodiment, lenticules 274 comprise a set of hemi-cylindrical lenses shown in cross-section in FIG. 8. However, lenticules 270 can comprise any useful optical element that causes the effects to be described herein with reference to FIG. 8, including but not limited to hemi-spherical lenses, hemi-aspherical or hemi-acylindrical lenses. Flat display surface 210 and depth image projection device 208 can be integrally related such that, for example, the depth image projection device 208 could be formed on one side of the glass of the display 200.

Using this system, when an image is viewed from the different view points 220, 230 and 240, the viewer sees different content. For example, a viewer observing the image from the particular angle of view point 220 sees imaging information formed from area X of the image. However, a viewer observing the scene from view point 230 sees imaging information from area Y of the image. Similarly, a viewer observing the image from view point 240 sees imaging information from area Z of the image. This effect can be used to present different imaging information to the two eyes of an observer. For example, if the left eye of an observer is located at view point 220 while the right eye of an observer is located at view point 230, the left eye will see that portion of the display image that is located in area X of the displayed image while the right eye of the observer, looking at the same image on the same screen will see image Y.

To create the appearance of depth using depth viewer 43 having a depth image projection device 208 such as lenticular screen 212, different imaging information is displayed in areas X and Y of flat display surface 210. For example, depth viewer 43 can be used to present an image of first view 202 of a scene in area X and a second view of the same scene taken from a different perspective than the perspective of the first view in area Y. When an observer positioned at a first angle of view 202 with his left eye at view point 220 and his right eye at view point 230 the observer will be able to detect parallax induced differences between the first image and the second image. The mind of the observer can interpret these differences as depth in an image. This achieves a stereoscopic depth effect. Look around effects can be created by using a look around position control 123 in the manner described above with respect to the binocular embodiment of depth viewer 43.

A look around depth effect can also be created using flat display surface 210. That is, the image presented to the observer would look as if it was a three dimensional object that would have different characteristics depending upon the angle of view relative to the screen. This is done, in the example shown in FIG. 8, by displaying imaging information from a third image on area Z of flat display surface 210. This effect becomes noticeable when a viewer whose eyes are located at view points 220 and 230 changes perspective relative to the image to a second angle of view 204 wherein his left eye is moved to view point 230 and his right eye is positioned at view point 240. This causes the mind of the observer to see a version of the scene that incorporates only the imaging information from the second and third images. The appearance of the scene as observed at the first angle of first view 202 has imaging information that is not apparent from second angle of view 204. Thus, the viewer can effectively look around the scene simply by changing the viewing angle with respect to the depth viewer 43. Adding additional images in other areas behind each lenticule 274 of lenticular screen 212 allows the observer to see additional view points by changing her angular perspective with respect to the depth viewer 43.

As is described in the '383 patent, to provide a depth image, a slightly different image of the same content from a different perspective must be presented to each eye of the viewer and when the viewer changes position within the range of view points suitable for viewing the particular depth image. Additional information concerning how depth images are created and recorded can be found in the related applications previously mentioned and the theory behind depth or three dimensional images can be obtained from Three-Dimensional Imaging Techniques, Okoshi, Academic Press, New York, 1976. The images that correspond to a particular content and thus to a particular view point are called a content group. Within this content group each of the lenticular scan line images presents to the viewer a different slice or portion of a view of the same content, thereby allowing depth to be perceived. The groups that correspond to a particular lenticule are called a lenticular set and FIG. 8 shows three lenticular sets, 260, 262 and 264. For example, in FIG. 8 the image that is seen from view point 220 is composed of a group of scan line images 222, 224 and 226 each associated with different lenticules 270, 272 and 274 and projected to the viewer by the lenticular screen 212. Of importance to note is that the position of the group of content images is different for each lenticule with respect to what could be called the optical axis 276, 278 and 280 of each lenticule. For example, the content group containing scan line image 222 from view point 220 is arranged directly under the optical axis 276 of lenticule 270 while the same content group has a scan line image 226 for lenticule 274 that is displaced to the left with respect to the optical axis 280 of that lenticule 274.

The same principle happens with respect to view point 230 except that the displacement, instead of moving in a single direction as occurs with respect to view point 220, moves in both directions on both sides of the center of the display. For example, the content group that includes scan line image 236 is observable from view point 230. For this to occur scan line image 236 is displaced to the left of the optical axis 280 of the lenticule 274 while the scan line image 234 is displaced to the right of the optical axis 276 of lenticule 270. As can be seen from the illustration in FIG. 8 the image content group for each view point is displaced differently depending on the location of the view point and the relative location of the lenticule projecting its slice of the view to the view point.

The spacing between lenticular sets or displacement of the center of each set with respect to the corresponding optical axis also varies across the substrate where the spacing or displacement increases as the projecting lenticule moves out from the center of the depth viewer 43. That is, not only must the intergroup spacing or displacement be adjusted to account for the viewpoint but the interlenticule set spacing or displacement must also account for the different viewpoints. With a lenticular screen 212 having 53 lenticules per inch it is possible to create 24 separate scan line images which correspond to a particular lenticule. That is, 24 different images can be presented to the viewer depending upon the view point of the viewer.

In such a situation each lenticule would project a different scan line or image slice to a different view point and the viewers eye/brain integrates all the slices into a single picture or image. When a depth image is desired, at least two images must be used to provide a different perspective for each eye when viewing the content from that particular view point. As a result, it is possible to have 12 different view points providing 12 depth images in a compound document for the typical lenticular screen. However, a much higher quality depth image is provided when at least four different images are used to create each content group, thereby allowing up to six view points from which a depth image can be provided over a small range of viewing angles. To provide even higher quality image content, viewable over a larger viewing range the content document preferably has three view points allowing eight different images to be perceived from a range around a particular view point thereby providing a much better sense of depth for each of the depth images. The spacing or changes in displacement of the groups and sets of images can be accomplished in accordance with the procedures described in more detail in the cross-referenced applications.

FIG. 9 illustrates the viewing area for the content groups associated with lenticule 274 of FIG. 8. As can be seen, the edges of each of the scan line images 226, 236 and 242 define the outer edges of the viewing area for each of the scan line images. The viewing area changes depending upon the angle with respect to the lenticule 274. As a result, the viewing area 294 for images from lenticule 274 from view point 220 is a larger area than the viewing area 290 for the content group 242 for view point 220 and it is thus useful to restrict the viewing area to the minimum viewing range provided for each view point which will be the view point directly over the center image group aligned with the view point. In this example, the minimum viewing area for viewpoint 240 is defined by scan line image 242 and lenticule 274.

Figures 10, 11:
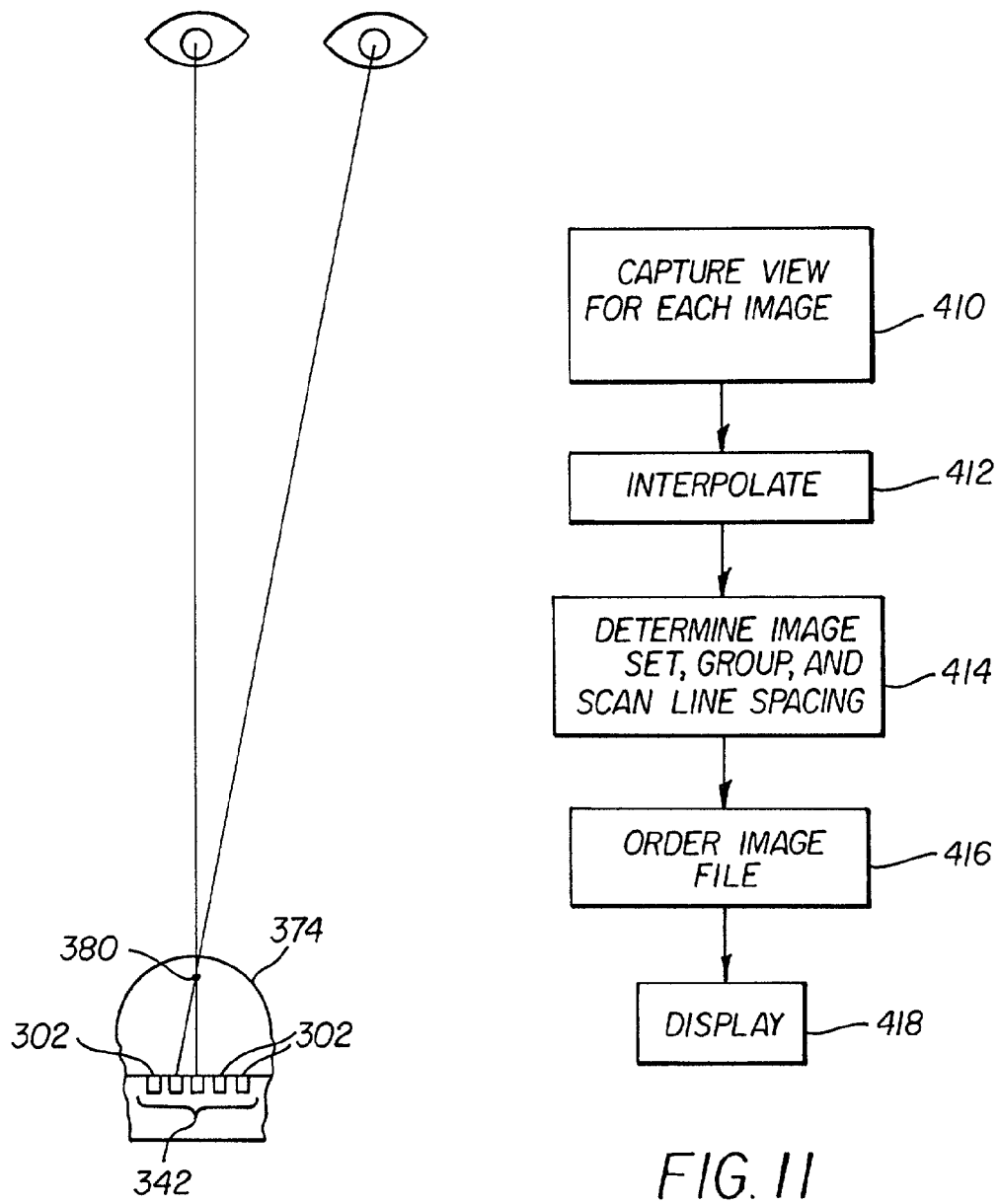
FIG. 10 illustrates a depth view having five scan line images associated with a lenticule.
FIG. 11 is a flow diagram of one method for preparing a multi-perspective image for viewing by an observer of a camera.

FIG. 10 shows another example from the '383 patent having five scan line images 302 associated with lenticule 374 having an optical axis 380. As can be seen, the eyes of the viewer perceive different ones of the scan lines, thereby providing the viewer with a sense of depth if each of the scan lines is from a different perspective of an originally captured scene. By providing multiple scan lines for each group, such as the five scan lines as illustrated in FIG. 10, as the viewers eyes move slightly with respect to the designated view point such as view point 240 different scan lines will be presented by each lenticule from a slightly different perspective, thereby preserving the stereoscopic or depth image effect and allowing the viewer a limited "look around" capability with respect to the content being viewed at each view point. It should be noted that the scan line spacing associated with each of the lenticular scan line image 302 is adjusted with a different spacing therebetween depending upon the viewing angle for that particular lenticule. This scan line spacing adjustment is described in the related applications previously mentioned.

In some embodiments, one of the "look around" views can include text overlaying the image. The text can include the date and time the image was captured, the camera settings (e.g. shutter speed, f/#), and/or text describing the image entered by the user via user controls 58 or a voice recognition system included in the camera 20 (not shown). The text can be rendered in 3-dimensions, and can be displayed at a depth that best separates it from the scene. In such embodiments, the text from one position is visible when the viewer looks at one of the views, and is not visible in other views.

FIG. 11 illustrates the procedure described in the '383 patent and used in one embodiment of the present invention to form images for presentation using a depth viewer 43 having depth image projection device 208. The first step is to capture the views for each image which will be presented within the multi-perspective image—(step 410). As previously mentioned, this capture and storage of the particular depth images is performed in the manner described above. Where desired, the optional step of generating additional images based upon the captured images can be performed. This can be done, for example, by using interpolation (step 412) to create new images as described in the related applications. Once a set of images to be used to form the multi-perspective image is established, the desired view points are used to determine (step 414) the set spacing for each lenticule, the image content group spacing or the spacing between groups and the order of that spacing, and the scan line spacing within each image. In the embodiment of camera 10 shown in FIG. 7, the view points can be determined based upon the assumption that the camera will be held in the hand when the depth image is viewed. Alternatively these spacings can be predefined with imaging information from the set of images being adapted and used to derive content groups having this fixed spacing. Once the spacing of the image lines is determined the imaging file for imaging the scan line images with the spacings desired is created (step 416) by sorting the scan lines with included spacing or positions into the order that they will be scanned during imaging. The controller of camera 20 and/or the digital signal processor 40 can dynamically establish the spacings and positions of the scan line images.

Various techniques for ordering and interleaving images to form a multi-perspective image are discussed in the related applications. For example, these image strips or lines from the different images are interleaved and aligned behind a corresponding lenticule at its focal point, in a known manner. Such interleaving is, for example, described in U.S. Pat. Nos. 4,506,296, 5,278,608, 5,276,478, 5,455,689, and 3,534,164. The system then displays the image (step 418) using display 200.

Because the content groups from the same view point have different viewing areas as illustrated in FIG. 9 it is important for the viewers to be reminded to keep their eyes within the appropriate viewing areas. To help provide this and to help distinguish or alert the viewer that the viewer is changing content images as the viewer moves, with respect to the display, between the content groups, an image demarcation line, such as a black line, can be provided. This line will cause the viewer to perceive that the entire compound image has turned dark as the viewer moves from one view point to the next view point. As the viewer moves past the edge of the acceptable viewing range the image will darken, detracting from the viewability of the image and thereby encouraging the viewer to move back to the acceptable areas. This demarcation line is created by filling in the intergroup gap, such as gap 266 shown in FIG. 8, with a black mask As is noted in the '383 patent, the content group viewable from different view points is defined such that all of the images presented to the viewer at that view point are of the same content. It is possible for that particular view point to create "ghost" images viewable within the content for that view point. For example, it is possible to present a ghost image containing text that appears overlayed or mixed in with the scan lines for each content group. Of course this could be a depth image allowing depth ghost text images within depth primary images. The spacings between or displacements of sets, content groups and scan lines has been described as continuously variable across the image responsive to the view point. It is possible to determine a compromise constant spacing which works well for all the desired view points and use that to fix the particular positions of the scan lines. The description has emphasized that the images from different view points are depth images of a stationary scene. However, it is of course possible for one or more of the images to be non depth images of a moving scene with the angularly changing image information being used for example to allow a photographer to cycle through a set of related images such as a set of images captured using a "motion burst" mode.

The description also indicates that the spacing of the groups, etc. is determined each time a multi-perspective image is produced. It is possible to standardize the arrangement and spacing of the images and to produce a map that designates where each scan line is to be located for a particular type of multi-perspective image. This may be preferable in order to simplify the calculations performed by digital signal processor 40 in digital camera 20.

In the embodiments of FIGS. 7-11, depth viewer 43 can also be used to provide conventional preview and other imaging functions. Where this is done, for example, in the embodiments shown in FIGS. 7-11, the lenticular or other depth display device can be caused to present the same imaging information in areas A, B and C of the display. Because there are no parallax induced differences in the images observed by the viewer, an image that is so presented will have a conventional two dimensional appearance. In this mode the lenticular screen 212 serves to widen the effective field of view of the depth viewer 43 for preview sharing purposes.

Figure 12:
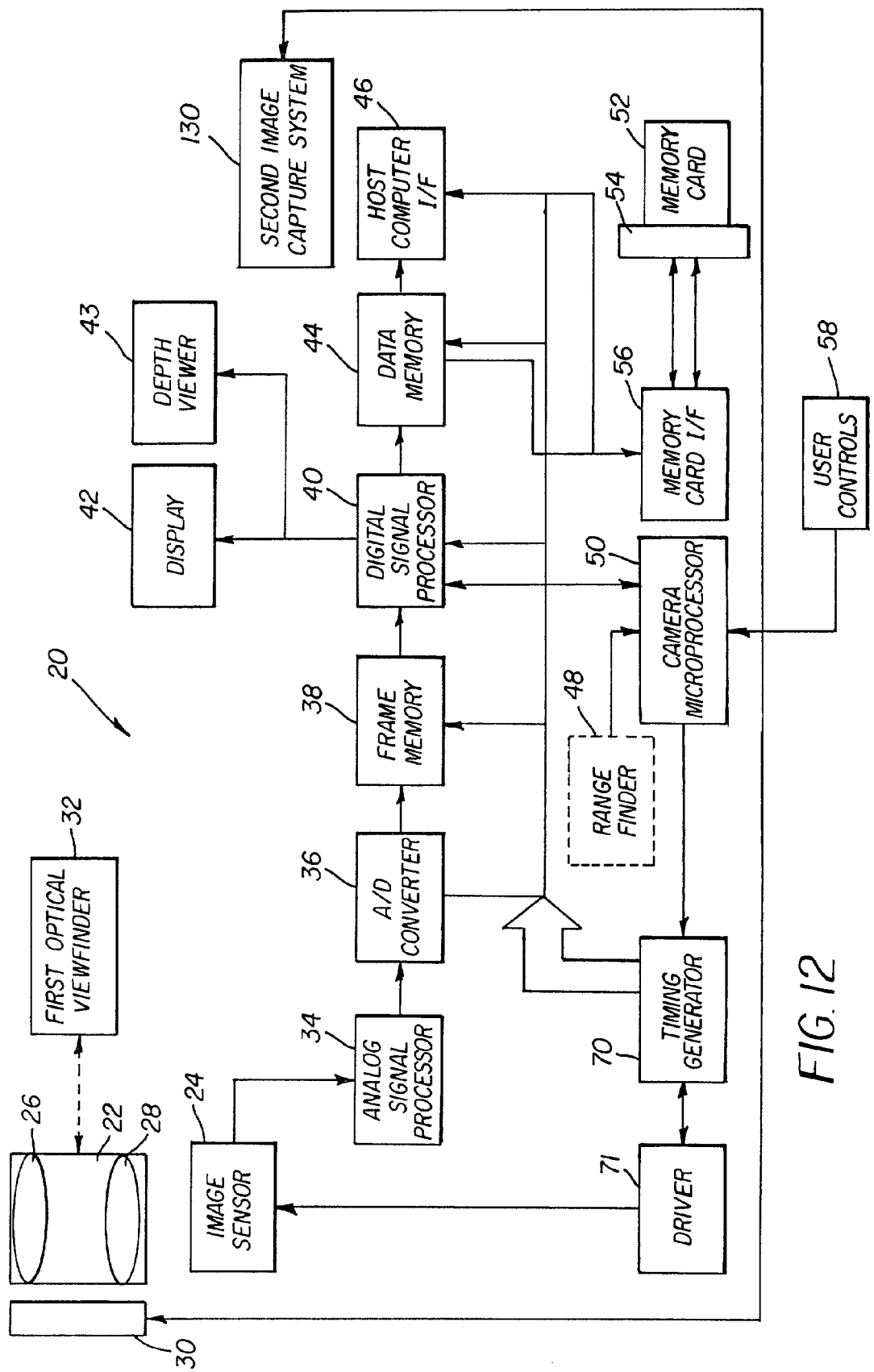
FIG. 12 illustrates another embodiment of the camera of the present invention.

As is shown in FIG. 12, one embodiment of camera 304 can include a second image capture system 130 such as a film image capture system. Where archival images are stored on film, metadata can be stored in association with the film that indicates which of the images on the film are to be incorporated into a multi-perspective image and in which order. This metadata can be stored, for example, on a strip of magnetic material, or on an optical form on the film. The metadata can also be stored on an electronic memory that is associated with the film. The metadata can, for example, be recorded using a binary or other machine readable code. The metadata can be recorded in formatted blocks with each block having a start sentinel, metadata and an end sentinel. For redundancy, multiple copies of each block can be recorded.

Figure 13:
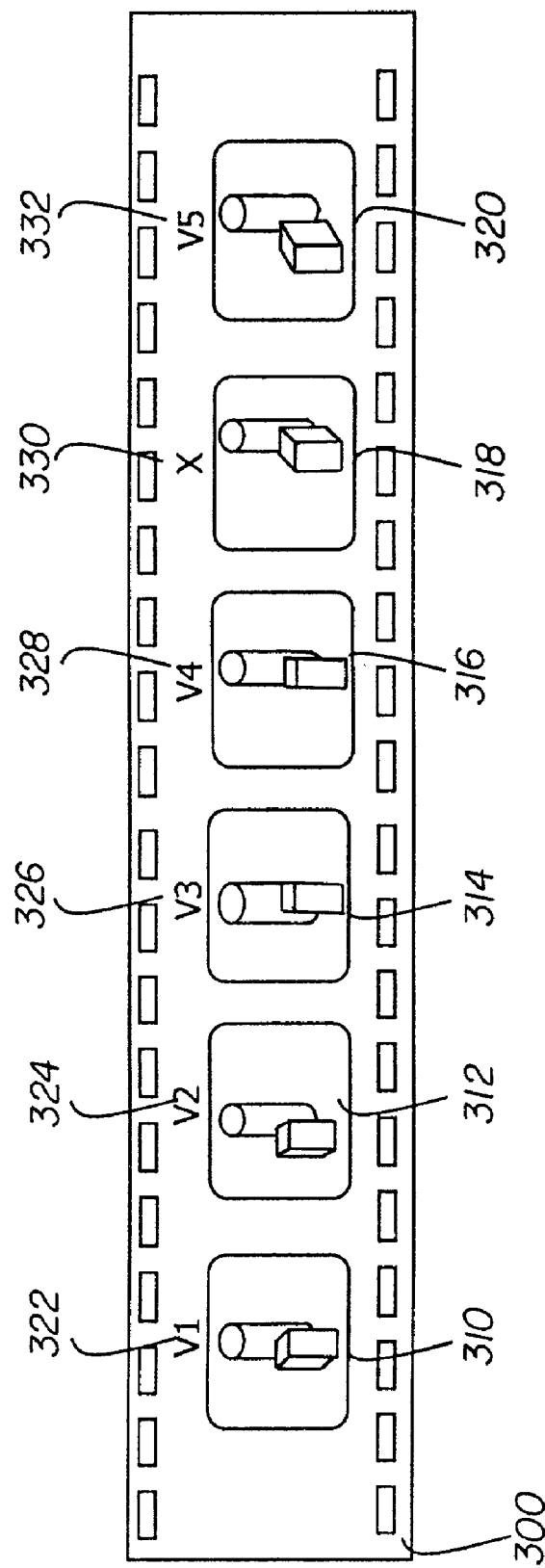
FIG. 13 shows an illustrative example of a film having metadata encodement.

FIG. 13 shows an illustrative example of a film 300 having such a metadata encodement. As is shown in FIG. 13, film 300 has six images recorded thereon. For purposes of this illustration, archival image 310 represents an archival image of scene 90 of FIG. 5 that is recorded at position D of FIG. 5. Similarly, image 312 recorded at position E of FIG. 5, image 314 is an image that is recorded at position F of FIG. 5, image 316 recorded at position G of FIG. 5, image 318 recorded at position H shown in FIG. 5, and additional image 320 recorded at position G' shown in FIG. 5. Metadata elements 322, 324, 326, 328, 330 and 332 are associated with, respectively, images 310, 312, 314, 316, 318 and 320. This metadata indicates that the image is to be included in a multi-perspective image and the context that the image is to be used in association with. In this example, the photographer has reviewed view 4 shown in FIG. 5 which combines images 316 and 318 and determined that she does not like the view. Accordingly the photographer uses user controls 58 to indicate to camera microprocessor 50 that image 318 is not to be included in the depth image. In this embodiment, metadata elements 322-332 are optically recorded on film 300 in association with image 318 indicating that the image is not to be used. An additional image 320 is captured and metadata element 332 is associated with additional image 320 indicating that additional image 320 is to be combined with image 316 to form a revised view 4.

Figure 14:
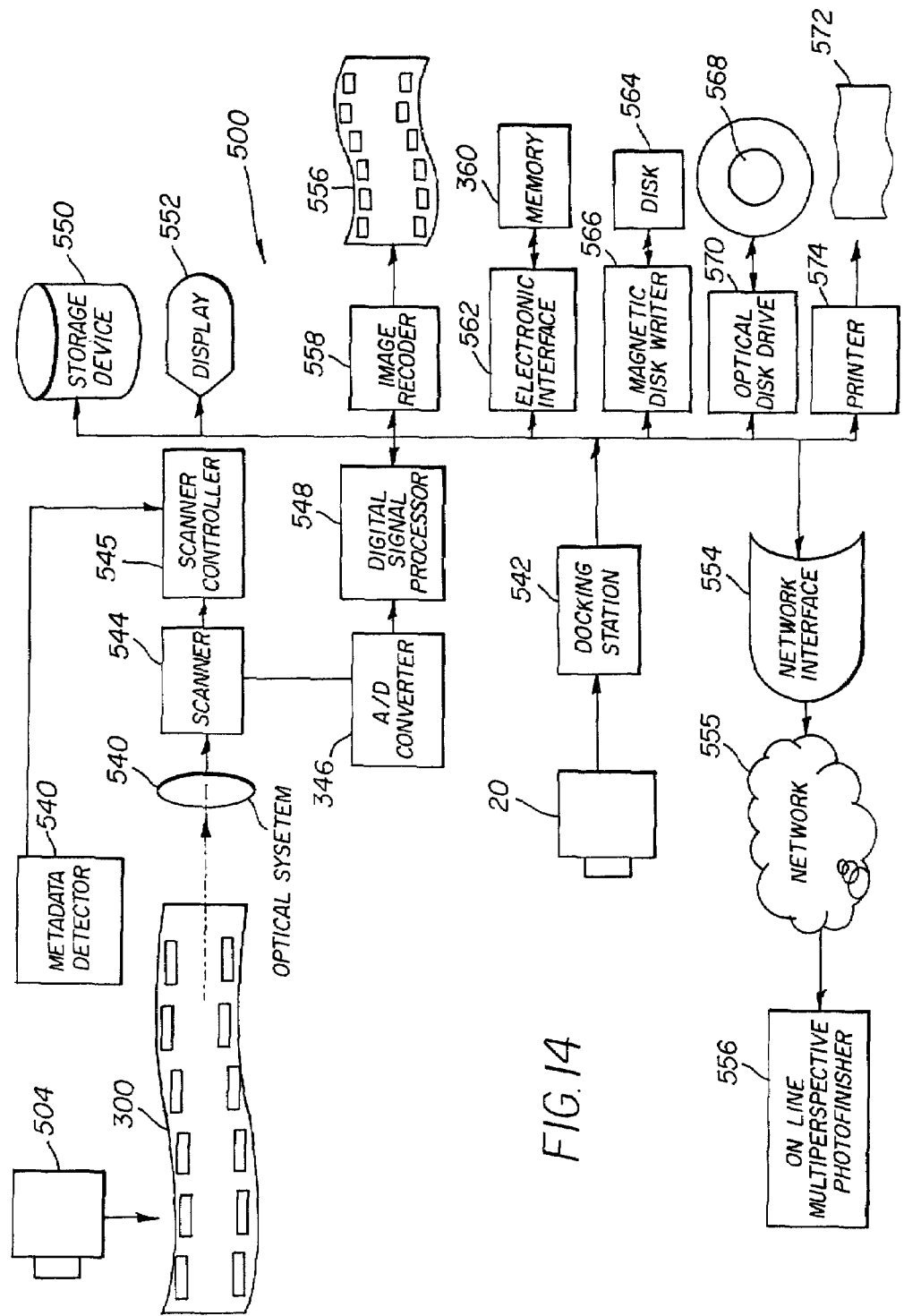
FIG. 14 shows an embodiment of an image processing apparatus for forming a multi-perspective image having metadata recorded thereon.

FIG. 14 shows an embodiment of an image processing apparatus 500 for forming a multi-perspective image using a film 502 having a multi-perspective image and metadata recorded thereon. In this embodiment, a camera 504 records images on film 300. Film 300 is extracted from camera 504 and processed. The processed film 300 is then provided to apparatus 500. In this embodiment a metadata detector 540 detects the recorded metadata and generates a signal which is received by scanner controller 545. In the embodiment shown, detector 540 examines the magnetic signals on the images on the film to detect the metadata elements 522-532. Scanner controller 545 receives these metadata elements and extracts useful information from the metadata elements including information indicating that images 310, 312, 314, and 316 are to be incorporated in a multi-perspective image. Each of images 310, 312, 314 and 316 are then scanned using optical system 540, which includes a film illumination system a scanner lens, and scanner image sensor 544, and converted into a digital form by analog to digital converter 546. The digital image files representing images 310, 312, 314 and 316 are then provided to digital signal processor 548. When detector 540 detects metadata element 330, detector 540 sends a signal to scanner controller 545 indicating that image 318 is not to be included in the multi-perspective image. Scanner controller 545 then omits the process of scanning image 318 and to proceeds to scan additional image 320. Additional image 320 is then scanned and converted into digital form. The digital form of additional image 320 is then provided to digital signal processor 548 which incorporates additional image 320 as a final image in a series of images including image 310, 312, 314, 316 and 320 in sequence. A multi-perspective image is then formed by digital signal processor 548.

The multi-perspective image can be electronically transmitted to a remote location or written to a variety of output devices as shown in FIG. 14 including, but not limited to, photosensitive element recorder 358, which records images on a photosensitive element 356. The multi-perspective image can also be recorded on a print media 572 such as a paper or film using for example a printer 574 which can be a thermal printer, electrophotographic printer, ink-jet or other form of printer. A recorded multi-perspective image can then be joined to a depth image projection device such as a lenticular screen to form a depth image. Digital data representing the multi-perspective image can be stored in, for example, CD or DVD disks 568 using an optical drive 570, magnetic electronic signal storage disks 564 by way of a magnetic drive 566, and other types of storage devices 550 and display devices 552 known in the art. A network interface 554 is also shown in FIG. 14. This interface permits captured multi-perspective images to be transmitted by way of a telecommunications network 355 to a multi-perspective image photofinisher 557 for professional quality photofinishing. Multi-perspective images can also be provided by digital camera 20 connected using docking station 542. In the above described embodiments depth image projection device 208 has been described as a lenticular screen. In other embodiments depth image projection device 208 can comprise an optical barrier such as is described in the '383 patent which blocks a first portion of light from a display from one eye of an observer while blocking a second portion of light from a display from the other eye of the observer.

PARTS LIST 20 camera
22 taking lens unit
24 image sensor
26 mobile elements
28 stationary elements
29 mirror
30 lens driver
32 first viewfinder
31 mirror
33 first display
34 analog signal processor
35 second viewfinder
36 A/D converter
37 second display
38 frame memory
39 display driver
40 digital signal processor
41 display driver
42 image display
43 depth viewer 44 data memory
46 host computer interface
48 range finder
50 camera microprocessor
52 removable memory card
54 memory card slot
56 memory card interface
58 user controls
60 shutter release
62 wide zoom lens button
64 tele zoom lens button
66 shutter
70 timing generator
71 sensor driver
90 scene
92 first image
93 capture axis
94 second image
96 third image
100 select stereo step
102 present live preview step
104 compose image step
105 press trigger step
106 capture first image step
108 present first image step
110 present live preview step
112 compose second image step
114 press trigger step
116 capture next image step
118 present second image step
120 review stereo pair step
122 accept step
123 look around position control
124 further process step
126 form differential image step
128 store difference image step
130 render output step
130 second image capture system
200 display
202 first view
208 depth image projection device
210 flat display surface
212 lenticular screen
220 view point
222 scan line image
224 scan line image
226 scan line image
230 view point
232 scan line image
234 scan line image
236 scan line image
240 view point
242 scan line image
250 first angle view
260 lenticular set
262 lenticular set
264 lenticular set
266 gap
270 lenticule
272 lenticule
274 lenticule
276 optical axis
278 optical axis
280 optical axis
290 viewing area
292 viewing area
294 viewing area
300 film
302 scan line image
310 image
312 image
314 image
316 image
318 image
320 additional image
322 metadata elements
324 metadata elements
326 metadata elements
328 metadata elements
330 metadata elements
331 image processing apparatus
332 metadata elements
374 lenticule
380 optical axis
410 capture view step
412 interpolate step
414 determine step
416 order step
418 display step
504 camera
540 optical system
542 content group
544 scanner image sensor
545 scanner controller
546 digital converter
548 signal processor
550 storage device
552 display devices
555 network
556 photosensitive element
557 multi-perspective image photofinisher
558 image recorder
564 storage disks
566 magnetic drive
568 DVD disk
570 optical drive
572 print media
A imaging position
B imaging position
C imaging position
D imaging position
E imaging position
F imaging position
G imaging position
G' imaging position
H imaging position
X area
Y area
Z area

What is claimed is:

1. A camera adapted to present a preview image, the camera comprising:

a trigger adapted to generate a trigger pulse;

an image capture system having one first lens system and a first imager for capturing a single perspective image of a scene;

a viewer adapted to present one image to a first viewing area and another image to a second viewing area; and a controller adapted to receive a first trigger pulse and to cause the first image capture system to capture a first image of the scene through the first lens system and first imager in response to the first trigger pulse and to present the first image in the first viewing area after the capture of the first image, while also presenting in the second viewing area a stream of evaluation images representing field of view of the scene then confronting the first lens system and the first imager such that a viewer positioned with a first eye in the first viewing area and a second eye in the second viewing area can view parallax differences between the first image and a current field of view of the first image capture system while composing a second image, the controller also being adapted to receive a second trigger pulse and to cause the image capture system to capture a second image of the scene in response to the second trigger pulse and to cause the viewer to simultaneously present the first image to the first viewing area and to present the second image to the second viewing area whereby an observer positioned with a first eye in the first viewing area and a second eye in the second viewing area can detect parallax differences between the first image and the second image, said second image being captured after presentation of the first image to the first viewing area.

2. The camera of claim 1, wherein the viewer comprises a pair of optical systems the first optical system adapted to present one image to the first viewing area and a second optical system adapted to present another image to the second viewing area.

3. The camera of claim 2, wherein each optical system comprises a separate display.

4. The camera of claim 1, wherein said viewer comprises a display and said controller generates a preview image for presentation on the display, said preview image adapted so that an image based upon the first image is formed for presentation on first portions of the display and an image based upon of the second image is formed for presentation on second portions of the display.

5. The camera of claim 4, wherein the viewer further comprises an array of micro-lenses positioned between the display and the viewing areas with the array adapted to direct light from the first portions of the display to the first viewing area and to direct light from the second portions of the display to the second viewing area.

6. The camera of claim 4, wherein the viewer further comprises optical baffler between the display and the viewing areas with the barrier adapted to substantially prevent light from the first portion of the display from entering the second viewing area and further adapted to substantially prevent light from the second portion of the display from entering the first viewing area.

7. The camera of claim 1, wherein the controller is further adapted to receive a plurality of additional trigger pulses and to capture an image in response to each additional trigger pulse.

8. The camera of claim 7, wherein the viewer is adapted to detect a viewing angle and to present two of the captured images based on the viewing angle.

9. The camera of claim 1, wherein the camera further comprising a memory for storing at least one of the captured images and any preview images and the camera stores the captured images in the memory.

10. The camera of claim 1, wherein the camera further comprises a zoom lens which is positioned in response to a zoom lens control, and the zoom lens position is locked after the first trigger pulse is received, so that the first image and the second image are captured using the same zoom lens position.

11. The camera of claim 1, wherein the camera further comprises an adjustable focus lens which is positioned in response to an autofocus operation, and the lens focus position is locked after the first trigger pulse is received, so that the first image and the second image are captured using the same lens focus position.

12. The camera of claim 1, further comprising a second image capture system adapted to record an archival image, with said controller causing the second image capture system to record archival images representing the captured images of the scene.

13. A camera adapted to present a preview image, the camera comprising:
a trigger adapted to generate a trigger pulse;
an image capture system having a first lens system and a first imager for capturing a single perspective image of a scene;
a viewer adapted to present a first captured image to a first viewing area and to present other captured images to a second viewing area; and
a controller adapted to receive a first trigger pulse and to cause the image capture system to capture a first image using the first lens system and first imager in response thereto with the controller further being adapted to cause the image capture system to capture a stream of images using the first lens system and the first imager after capture of the first image and the viewer to present the stream of images to the second viewing area while simultaneously presenting the first image to the first viewing area, with the controller also being adapted to receive a second trigger pulse and, in response thereto to select one of the stream of images as a second image, whereby an observer can position only one eye in the first viewing area and only another eye in the second viewing area to observe parallax differences between first image and the stream of images when selecting the second image.

14. The camera of claim 13, wherein further comprising a memory, wherein the controller stores the first image and the second image as a stereo pair.

15. The camera of claim 13, wherein said viewer comprises a pair of displays each adapted to separately confront one of the first and second viewing areas.

16. The camera of claim 13, wherein said viewer comprises a display and said controller generates a preview image for presentation on the display, said preview image being adapted so that an image based upon the first image is formed for presentation on a first portion of the display and an image based upon of the second image is formed for presentation on a second portion of the display.

17. The camera of claim 16, wherein the viewer comprises a display adapted to present a preview image and an array of micro-lenses positioned between the display and the viewing areas with the array adapted to direct light from the first portion of the display the first viewing area and to direct light from the second portion of the display to the second viewing area.

18. The camera of claim 16, wherein the viewer further comprises an optical baffler between the display and the viewing areas with the barrier adapted to substantially prevent light from the first portion of the display from entering the second viewing area and further adapted to substantially prevent light from the second portion of the display from entering the first viewing area.

19. The camera of claim 13, wherein after the second image is selected, the second image is displayed in the first viewing area and the stream of images is presented the second viewing area and wherein said controller is further adapted to receive at least one additional trigger pulse and to select at least one additional image from the stream of images in response thereto.

20. The camera of claim 19, wherein the controller is further adapted to generate a preview image for presentation on the display with the preview image adapted to contain image information representing each of the selected images and wherein the viewer comprises a display for presenting the preview image and an array of micro-lenses to direct light from the display so that the first image is presented only to the first viewing area while the second image is presented only to the second viewing area.

21. The camera of claim 13, wherein the controller is adapted to receive a plurality of trigger pulses and to select an image from the stream of images in response to each trigger pulse.

22. The camera of claim 21, wherein the controller causes the display to present an image of the last selected image to one viewing area while presenting a stream of preview images to another viewing area.

23. The camera of claim 22, wherein the controller selects viewing area to present the last selected image based upon a detected change in the perspective between the last selected image and the stream of images captured after the last selected image.

24. The camera of claim 23, further comprising a second image capture system adapted to record an archival image, with said controller causing the second image capture system to record an archival image representing each selected image of the scene.

25. The camera of claim 13, wherein the camera further comprises a zoom lens which is positioned in response to a zoom lens control, and the zoom lens position is locked after the first trigger pulse is received, so that the first image and the second image are captured using the same zoom lens position.

26. The camera of claim 13, wherein the camera further comprises an adjustable focus lens which is positioned in response to an autofocus operation, and the lens focus position is locked after the first trigger pulse is received, so that the first image and the second image are captured using the same lens focus position.

* * * * *

UNITED STATES PATENT AND TRADEMARK OFFICE
CERTIFICATE OF CORRECTION

PATENT NO. : 7,466,336 B2  Page 1 of 1
APPLICATION NO. : 10/235524
DATED : December 16, 2008
INVENTOR(S) : Michael T. Regan et al.

It is certified that error appears in the above-identified patent and that said Letters Patent is hereby corrected as shown below:

Title of Page, Item [56]   Under FOREIGN PATENT DOCUMENTS, delete duplicate "JP 64-086129 * 3/1989"
Column 21, Claim 6, line 42   Replace the word "baffler" with the word -- barrier --
Column 22, Claim 18, line 58   Replace the word "baffler" with the word -- barrier --

Signed and Sealed this

Tenth Day of March, 2009

JOHN DOLL
*Acting Director of the United States Patent and Trademark Office*